US008796615B2

(12) United States Patent
Green et al.

(10) Patent No.: US 8,796,615 B2
(45) Date of Patent: Aug. 5, 2014

(54) MASS SPECTROMETER

(71) Applicant: Micromass UK Limited, Manchester (GB)

(72) Inventors: Martin Raymond Green, Bowdon (GB); Daniel James Kenny, Knutsford (GB); David J. Langridge, Stockport (GB); Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 13/848,504

(22) Filed: Mar. 21, 2013

(65) Prior Publication Data

US 2013/0221242 A1 Aug. 29, 2013

Related U.S. Application Data

(63) Continuation of application No. 12/668,813, filed as application No. PCT/GB2008/002402 on Jul. 14, 2008, now Pat. No. 8,426,803.

(60) Provisional application No. 60/951,974, filed on Jul. 26, 2007.

(30) Foreign Application Priority Data

Jul. 12, 2007 (GB) .................................. 0713590.8

(51) Int. Cl.
*B01D 59/44* (2006.01)
*H01J 49/00* (2006.01)

(52) U.S. Cl.
USPC ........... 250/283; 250/281; 250/282; 250/287; 250/288; 250/289; 250/290; 250/291; 250/292

(58) Field of Classification Search
USPC .................................. 250/281–283, 287–292
See application file for complete search history.

(56) References Cited

U.S. PATENT DOCUMENTS

| | | | | | |
|---|---|---|---|---|---|
| 5,847,386 | A | * | 12/1998 | Thomson et al. | 250/288 |
| 6,111,250 | A | * | 8/2000 | Thomson et al. | 250/282 |
| 6,114,691 | A | | 9/2000 | Cousins | |

(Continued)

FOREIGN PATENT DOCUMENTS

EP 0817239 1/1998

OTHER PUBLICATIONS

Londry et al., "*Mass Selective Axial Ion Ejection From a Linear Quadrupole Ion Trap*" American Society for Mass Spectrometry, pp. 1130-1147, vol. 14, 2003.

(Continued)

*Primary Examiner* — Jack Berman
*Assistant Examiner* — Meenakshi Sahu
(74) *Attorney, Agent, or Firm* — Diederiks & Whitelaw, PLC

(57) ABSTRACT

A mass spectrometer is disclosed comprising a quadrupole rod set ion trap wherein a potential field is created at the exit of the ion trap which decreases with increasing radius in one radial direction. Ions within the ion trap are mass selectively excited in a radial direction. Ions which have been excited in the radial direction experience a potential field which no longer confines the ions axially within the ion trap but which instead acts to extract the ions and hence causes the ions to be ejected axially from the ion trap.

20 Claims, 15 Drawing Sheets

(56) References Cited

U.S. PATENT DOCUMENTS

| | | | | |
|---|---|---|---|---|
| 6,177,668 | B1 * | 1/2001 | Hager | 250/282 |
| 6,504,148 | B1 * | 1/2003 | Hager | 250/282 |
| 6,630,662 | B1 * | 10/2003 | Loboda | 250/281 |
| 7,071,464 | B2 * | 7/2006 | Reinhold | 250/282 |
| 7,459,679 | B2 | 12/2008 | Loboda | |
| 7,633,060 | B2 | 12/2009 | Kovtoun | |
| 7,709,785 | B2 | 5/2010 | Jolliffe et al. | |
| 8,389,933 | B2 | 3/2013 | Hoyes | |
| 8,389,993 | B2 | 3/2013 | Hoyes | |
| 8,426,803 | B2 * | 4/2013 | Green et al. | 250/281 |
| 2004/0011956 | A1 | 1/2004 | Londry et al. | |
| 2004/0051036 | A1 | 3/2004 | Franzen et al. | |
| 2005/0127290 | A1 | 6/2005 | Hashimoto et al. | |
| 2007/0181804 | A1 * | 8/2007 | Hashimoto et al. | 250/290 |
| 2008/0121795 | A1 | 5/2008 | Sugiyama et al. | |
| 2010/0252730 | A1 * | 10/2010 | Green et al. | 250/283 |

OTHER PUBLICATIONS

Hager, "*A New Linear Ion Trap Mass Spectrometer*" Rapid Communications in Mass Spectrometry, pp. 512-526, vol. 16, 2002.

Landry et al., "*Mass Selective Axial Ion Ejection From a Linear Quadrupole Ion Trap*" American Society for Mass Spectrometry, pp. 1130-1147, vol. 14, 2003.

* cited by examiner

MASS SPECTROMETER

CROSS REFERENCE TO RELATED APPLICATIONS

This application is a continuation of U.S. patent application Ser. No. 12/668,813 filed May 20, 2010, which is the National Stage of International Application No. PCT/GB2008/002402, filed Jul. 14, 2008, which claims priority to and benefit of United Kingdom Patent Application No. 0713590.8, filed Jul. 12, 2007 and U.S. Provisional Patent Application Ser. No. 60/951,974, filed Jul. 26, 2007. The entire contents of these applications are incorporated herein by reference.

BACKGROUND OF THE INVENTION

The present invention relates to a mass spectrometer, a method of mass spectrometry, an ion trap and a method of trapping ions.

3D or Paul ion traps comprising a central ring electrode and two end-cap electrodes are well known and provide a powerful and relatively inexpensive tool for many types of analysis of ions.

2D or linear ion traps ("LIT") comprising a quadrupole rod set and two electrodes for confining ions axially within the ion trap are also well known. The sensitivity and dynamic range of commercial linear ion traps have improved significantly in recent years. A linear ion trap which ejected ions axially (rather than radially) would be particularly suited for incorporation into a hybrid mass spectrometer having a linear ion path geometry. However, most commercial linear ion traps eject ions in a radial direction which causes significant design difficulties.

It is therefore desired to provide an improved ion trap wherein ions are ejected axially from the ion trap.

BRIEF SUMMARY OF THE INVENTION

According to an aspect of the present invention there is provided an ion trap comprising:

a first electrode set comprising a first plurality of electrodes;

a second electrode set comprising a second plurality of electrodes;

a first device arranged and adapted to apply one or more DC voltages to one or more of the first plurality of electrodes and/or to one or more of the second plurality electrodes so that:

(a) ions having a radial displacement within a first range experience a DC trapping field, a DC potential barrier or a barrier field which acts to confine at least some of the ions in at least one axial direction within the ion trap; and (b) ions having a radial displacement within a second different range experience either: (i) a substantially zero DC trapping field, no DC potential barrier or no barrier field so that at least some of the ions are not confined in the at least one axial direction within the on trap; and/or (ii) a DC extraction field, an accelerating DC potential difference or an extraction field which acts to extract or accelerate at least some of the ions in the at least one axial direction and/or out of the ion trap; and a second device arranged and adapted to vary, increase, decrease or alter the radial displacement of at least some ions within the on trap.

The second device may be arranged:

(i) to cause at least some ions having a radial displacement which falls within the first range at a first time to have a radial displacement which falls within the second range at a second subsequent time; and/or (ii) to cause at least some ions having a radial displacement which falls within the second range at a first time to have a radial displacement which fails within the first range at a second subsequent time.

According to a less preferred embodiment either: (i) the first electrode set and the second electrode set comprise electrically isolated sections of the same set of electrodes and/or wherein the first electrode set and the second electrode set are formed mechanically from the same set of electrodes; and/or (ii) the first electrode set comprises a region of a set of electrodes having a dielectric coating and the second electrode set comprises a different region of the same set of electrodes; and/or (iii) the second electrode set comprises a region of a set of electrodes having a dielectric coating and the first electrode set comprises a different region of the same set of electrodes.

The second electrode set is preferably arranged downstream of the first electrode set. The axial separation between a downstream end of the first electrode set and an upstream end of the second electrode set is preferably selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; (xi) 10-15 mm; (xii) 15-20 mm; (xiii) 20-25 mm; (xiv) 25-30 mm; (xv) 30-35 mm; (xvi) 35-40 mm; (xvii) 40-45 mm; (xviii) 45-50 mm; and (xix) >50 mm.

The first electrode set is preferably arranged substantially adjacent to and/or co-axial with the second electrode set.

The first plurality of electrodes preferably comprises a multipole rod set, a quadrupole rod set, a hexapole rod set, an octapole rod set or a rod set having more than eight rods. The second plurality of electrodes preferably comprises a multipole rod set, a quadrupole rod set, a hexapole rod set, an octapole rod set or a rod set having more than eight rods.

According to a less preferred embodiment the first plurality of electrodes may comprise a plurality of electrodes or at least 5, 10, 15, 20, 25, 30, 35, 40, 45, 50, 55, 60, 65, 70, 75, 80, 85, 90, 95, 100, 110, 120, 130, 140, 150, 160, 170, 180, 190 or 200 electrodes having apertures through which ions are transmitted in use. According to a less preferred embodiment the second plurality of electrodes may comprise a plurality of electrodes or at least 5, 10, 15, 20, 25, 30, 35, 40, 45, 50, 55, 60, 65, 70, 75, 80, 85, 90, 95, 100, 110, 120, 130, 140, 150, 160, 170, 180, 190 or 200 electrodes having apertures through which ions are transmitted in use.

According to the preferred embodiment the first electrode set has a first axial length and the second electrode set has a second axial length, and wherein the first axial length is substantially greater than the second axial length and/or wherein the ratio of the first axial length to the second axial length is at least 2, 3, 4, 5, 6, 7, 8, 9, 10, 11, 12, 13, 14, 15, 16, 17, 18, 19, 20, 25, 30, 35, 40, 45 or 50.

The first device is preferably arranged and adapted to apply one or more DC voltages to one or more of the first plurality of electrodes and/or to one or more of the second plurality of electrodes so as to create, in use, an electric potential within the first electrode set and/or within the second electrode set which increases and/or decreases and/or varies with radial displacement in a first radial direction as measured from a central longitudinal axis of the first electrode set and/or the second electrode set. The first device is preferably arranged and adapted to apply one or more DC voltages to one or more of the first plurality of electrodes and/or to one or more of the second plurality of electrodes so as to create, in use, an electric potential which increases and/or decreases and/or varies with radial displacement in a second radial direction as measured from a central longitudinal axis of the first electrode set and/or the second electrode set. The second radial direction is preferably orthogonal to the first radial direction.

According to the preferred embodiment the first device may be arranged and adapted to apply one or more DC voltages to one or more of the first plurality of electrodes and/or to one or more of the second plurality of electrodes so as to confine at least some positive and/or negative ions axially within the ion trap if the ions have a radial displacement as measured from a central longitudinal axis of the first electrode set and/or the second electrode set greater than or less than a first value.

According to the preferred embodiment the first device is preferably arranged and adapted to create, in use, one or more radially dependent axial DC potential barriers at one or more axial positions along the length of the ion trap. The one or more radially dependent axial DC potential barriers preferably substantially prevent at least some or at least 5%, 10%, 15%, 20%, 25%, 30%, 35%, 40%, 45% 50%, 65%, 60%, 65%, 70%, 75%, 80%, 85%, 90% or 95% of positive and/or negative ions within the ion trap from passing axially beyond the one or more axial DC potential barriers and/or from being extracted axially from the ion trap.

The first device is preferably arranged and adapted to apply one or more DC voltages to one or more of the first plurality of electrodes and/or to one or more of the second plurality of electrodes so as to create, in use, an extraction field which preferably acts to extract or accelerate at least some positive and/or negative ions out of the ion trap if the ions have a radial displacement as measured from a central longitudinal axis of the first electrode and/or the second electrode greater than or less than a first value.

The first device is preferably arranged and adapted to create, in use, one or more axial DC extraction electric fields at one or more axial positions along the length of the ion trap. The one or more axial DC extraction electric fields preferably cause at least some or at least 5%, 10%, 15%, 20%, 25%, 30%, 35%, 40%, 45%, 50%, 55%, 60%, 65%, 70%, 75%, 80%, 85%, 90% or 95% of positive and/or negative ions within the ion trap to pass axially beyond the DC trapping field, DC potential barrier or barrier field and/or to be extracted axially from the ion trap.

According to the preferred embodiment the first device is arranged and adapted to create, in use, a DC trapping field, DC potential barrier or barrier field which acts to confine at least some of the ions in the at least one axial direction, and wherein the ions preferably have a radial displacement as measured from the central longitudinal axis of the first electrode set and/or the second electrode set within a range selected from the group consisting of (i) 0-0.5 mm; (ii) 0.5-1.0 mm; (iii) 1.0-1.5 mm; (iv) 1.5-2.0 mm; (v) 2.0-2.5 mm; (vi) 2.5-3.0 mm; (vii) 3.0-3.5 mm; (viii) 3.5-4.0 mm; (ix) 4.0-4.5 mm; (x) 4.5-5.0 mm; (xi) 5.0-5.5 mm; (xii) 5.5-6.0 mm; (xiii) 6.0-6.5 mm; (xiv) 6.5-7.0 mm; (xv) 7.0-7.5 mm; (xvi) 7.5-8.0 mm; (xvii) 8.0-8.5 mm; (xviii) 8.5-9.0 mm; (xix) 9.0-9.5 mm; (xx) 9.5-10.0 mm; and (xxi) >10.0 mm.

According to the preferred embodiment the first device is arranged and adapted to provide a substantially zero DC trapping field, no DC potential barrier or no barrier field at at least one location so that at least some of the ions are not confined in the at least one axial direction within the ion trap, and wherein the ions preferably have a radial displacement as measured from the central longitudinal axis of the first electrode set and/or the second electrode set within a range selected from the group consisting of (i) 0-0.5 mm; (ii) 0.5-1.0 mm; (iii) 1.0-1.5 mm; (iv) 1.5-2.0 mm; (v) 2.0-2.5 mm; (vi) 2.5-3.0 mm; (vii) 3.0-3.5 mm; (viii) 3.5-4.0 mm; (ix) 4.0-4.5 mm; (x) 4.5-5.0 mm; (xi) 5.0-5.5 mm; (xii) 5.5-6.0 mm; (xiii) 6.0-6.5 mm; (xiv) 6.5-7.0 mm; (xv) 7.0-7.5 mm; (xvi) 7.5-8.0 mm; (xvii) 8.0-8.5 mm; (xviii) 8.5-9.0 mm; (xix) 9.0-9.5 mm; (xx) 9.5-10.0 mm; and (xxi) >10.0 mm.

The first device is preferably arranged and adapted to create, in use, a DC extraction field, an accelerating DC potential difference or an extraction field which acts to extract or accelerate at least some of the ions in the at least one axial direction and/or out of the ion trap, and wherein the ions preferably have a radial displacement as measured from the central longitudinal axis of the first electrode set and/or the second electrode set within a range selected from the group consisting of: (i) 0-0.5 mm; (ii) 0.5-1.0 mm; (iii) 1.0-1.5 mm; (iv) 1.5-2.0 mm; (v) mm; (vi) 2.5-3.0 mm; (vii) 3.0-3.5 mm; (viii) 3.5-4.0 mm; (ix) 4.0-4.5 mm; (x) 4.5-5.0 mm; (xi) 5.0-5.5 mm; (xii) 5.5-6.0 mm; (xiii) 6.0-6.5 mm; (xiv) 6.5-7.0 mm; (xv) 7.0-7.5 mm; (xi) 7.5-8.0 mm; (xvii) 8.0-8.5 mm; (xviii) 8.5-9.0 mm; (xix) 9.0-9.5 mm; (xx) 9.5-10.0 mm; and (xxi) > 10.0 mm.

The first plurality of electrodes preferably have an inscribed radius of r1 and a first longitudinal axis and/or wherein the second plurality of electrodes have an inscribed radius of r2 and a second longitudinal axis.

The first device is preferably arranged and adapted to create a DC trapping field, a DC potential barrier or a barrier field which acts to confine at least some of the ions in the at least one axial direction within the ion trap and wherein the DC trapping field, DC potential barrier or barrier field increases and/or decreases and/or varies with increasing radius or displacement in a first radial direction away from the first longitudinal axis and/or the second longitudinal axis up to at least 5%, 10%, 15%, 20%, 25%, 30%, 35%, 40%, 45%, 50%, 55%, 60%, 65%, 70%, 75%, 80%, 85%, 90%, 95% or 100% of the first inscribed radius r1 and/or the second inscribed radius r2.

The first device is preferably arranged and adapted to create a DC trapping field, DC potential barrier or barrier field which acts to confine at least some of the ions in the at least one axial direction within the ion trap and wherein the DC trapping field, DC potential barrier or barrier field increases and/or decreases and/or varies with increasing radios or displacement in a second radial direction away from the first longitudinal axis and/or the second longitudinal axis up to at least 5%, 10%, 15%, 20%, 25%, 30%, 35%, 40%, 45%, 50%, 55%, 60%, 65%, 70%, 75%, 80%, 85%, 90%, 95% or 100% of the first inscribed radius r1 and/or the second inscribed radius r2. The second radial direction is preferably orthogonal to the first radial direction.

The first device is preferably arranged and adapted to provide substantially zero DC trapping field, no DC potential barrier or no barrier field at at least one location so that at least some of the ions are not confined in the at least one axial direction within the on trap and wherein the substantially zero DC trapping field, no DC potential barrier or no barrier field extends with increasing radius or displacement in a first radial direction away from the first longitudinal axis and/or the second longitudinal axis up to at least 5%, 10%, 15%, 20%, 25%, 30%, 35%, 40%, 45%, 50%, 55%, 60%, 65%, 70%, 75%, 80%, 85%, 90%, 95% or 100% of the first inscribed radius r1 and/or the second inscribed radius r2. The first device is preferably arranged and adapted to provide a substantially zero DC trapping field, no DC potential barrier or no barrier field at at least one location so that at least some of the ions are not confined in the at least one axial direction within the ion trap and wherein the substantially zero DC trapping field, no DC potential barrier or no barrier field extends with increasing radius or displacement in a second radial direction away from the first longitudinal axis and/or the second longitudinal axis up to at least 5%, 10%, 15%, 20%, 25%, 30%, 35%, 40%, 45%, 50%, 55%, 60%, 65%, 70%, 75%, 80%, 85%, 90%, 95% or 100% of the first inscribed radius r1 and/or the second inscribed radius r2. The second radial direction is preferably orthogonal to the first radial direction.

The first device is arranged and adapted to create a DC extraction field, an accelerating DC potential difference or an extraction field which acts to extract or accelerate at least some of the ions in the at least one axial direction and/or out of the ion trap and wherein the DC extraction field, accelerating DC potential difference or extraction field increases and/or decreases and/or varies with increasing radius or displacement in a first radial direction away from the first longitudinal axis and/or the second longitudinal axis up to at least 5%, 10%, 15%, 20%, 25%, 30%, 35%, 40%, 45%, 50%, 55%, 60%, 65%, 70%, 75%, 80%, 85%, 90%, 95% or 100% of the first inscribed radius r1 and/or the second inscribed radius r2. The first device is preferably arranged and adapted to create a DC extraction field, an accelerating DC potential difference or an extraction field which acts to extract or accelerate at least some of the ions in the at least one axial direction and/or out of the on trap and wherein the DC extraction field, accelerating DC potential difference or extraction field increases and/or decreases and/or varies with increasing radius or displacement in a second radial direction away from the first longitudinal axis and/or the second longitudinal axis up to at least 5%, 10%, 15%, 20%, 25%, 30%, 35%, 40%, 45%, 50%, 55%, 60%, 65%, 70%, 75%, 80%, 85%, 90%, 95% or 100% of the first inscribed radius r1 and/or the second inscribed radius r2. The second radial direction is preferably orthogonal to the first radial direction.

According to the preferred embodiment the DC trapping field, DC potential barrier or barrier field which acts to confine at least some of the ions in the at least one axial direction within the ion trap is created at one or more axial positions along the length of the ion trap and at least at an distance x mm upstream and/or downstream from the axial centre of the first electrode set and/or the second electrode set, wherein x is preferably selected from the group consisting of (i) <1; (ii) 1-2; (iii) 2-3; (iv) 3-4; (v) 4-5; (vi) 5-6; (vii) 6-7; (viii) 7-8; (ix) 8-9; (x) 9-10; (xi) 10-15; (xii) 15-20; (xiii) 20-25; (xiv) 25-30; (xv) 30-35; (xvi) 35-40; (xvii) 40-45; (xviii) 45-50; and (xix) >50.

According to the preferred embodiment the zero DC trapping field, the no DC potential barrier or the no barrier field is provided at one or more axial positions along the length of the ion trap and at least at an distance y mm upstream and/or downstream from the axial centre of the first electrode set and/or the second electrode set, wherein y is preferably selected from the group consisting of: (i) <1; (ii) 1-2; (iii) 2-3; (iv) 3-4; (v) 4-5; (vi) 5-6; (vii) 6-7; (viii) 7-8; (ix) 8-9; (x) 9-10; (xi) 10-15, (xii) 15-20; (xiii) 20-25; (xiv) 25-30; (xv) 30-35; (xvi) 35-40; (xvii) 40-45; (xviii) 45-50; and (xix) >50.

According to the preferred embodiment the DC extraction field, the accelerating DC potential difference or the extraction field which acts to extract or accelerate at least some of the ions in the at least one axial direction and/or out of the ion trap is created at one or more axial positions along the length of the on trap and at least at an distance z mm upstream and/or downstream from the axial centre of the first electrode set and/or the second electrode set, wherein z is preferably selected from the group consisting of (i) <1; (ii) 1-2; (iii) 2-3; (iv) 3-4; (v) 4-5; (vi) 5-6; (vii) 6-7; (viii) 7-8; (ix) 8-9; (x) 9-10; (xi) 10-15; (xii) 15-20; (xiii) 20-25; (xiv) 25-30; (xv) 30-35; (xvi) 35-40; (xvii) 40-45; (xviii) 45-50; and (xix) >50.

The first device is preferably arranged and adapted to apply the one or more DC voltages to one or more of the first plurality of electrodes and/or to one or more of the second plurality of electrodes so that either.

(i) the radial and/or the axial position of the DC trapping field, DC potential barrier or barrier field remains substantially constant whilst ions are being ejected axially from the ion trap in a mode of operation; and/or (ii) the radial and/or the axial position of the substantially zero DC trapping field, no DC potential barrier or no barrier field remains substantially constant whilst ions are being ejected axially from the ion trap in a mode of operation; and/or (iii) the radial and/or the axial position of the DC extraction field, accelerating DC potential difference or extraction field remains substantially constant whilst ions are being ejected axially from the ion trap in a mode of operation.

The first device is preferably arranged and adapted to apply the one or more DC voltages to one or more of the first plurality of electrodes and/or to one or more of the second plurality of electrodes so as to:

(i) vary, increase, decrease or scan the radial and/or the axial position of the DC trapping field, DC potential barrier or barrier field whilst ions are being ejected axially from the ion trap in a mode of operation; and/or (ii) vary, increase, decrease or scan the radial and/or the axial position of the substantially zero DC trapping field, no DC potential barrier or no barrier field whilst ions are being ejected axially from the ion trap in a mode of operation; and/or (iii) vary, increase, decrease or scan the radial and/or the axial position of the DC extraction field, accelerating DC potential difference or extraction field whilst ions are being ejected axially from the ion trap in a mode of operation.

The first device is preferably arranged and adapted to apply the one or more DC voltages to one or more of the first plurality of electrodes and/or to one or more of the second plurality of electrodes so that:

(i) the amplitude of the DC trapping field. DC potential barrier or barrier field remains substantially constant whilst ions are being ejected axially from the ion trap in a mode of operation; and/or (ii) the substantially zero DC trapping field, the no DC potential barrier or the no barrier field remains substantially zero whilst ions are being ejected axially from the ion trap in a mode of operation; and/or (iii) the amplitude of the DC extraction field, accelerating DC potential difference or extraction field remains substantially constant whilst ions are being ejected axially from the ion trap in a mode of operation.

According to an embodiment the first device is preferably arranged and adapted to apply the one or more DC voltages to one or more of the first plurality of electrodes and/or to one or more of the second plurality of electrodes so as to:

(i) vary, increase, decrease or scan the amplitude of the DC trapping field, DC potential barrier or barrier field whilst ions are being ejected axially from the ion trap in a mode of operation; and/or (ii) vary, increase, decrease or scan the amplitude of the DC extraction field, accelerating DC potential difference or extraction field whilst ions are being ejected axially from the ion trap in a mode of operation.

The second device is preferably arranged and adapted to apply a first phase and/or a second opposite phase of one or more excitation, AC or tickle voltages tout least some of the first plurality of electrodes and/or to at least some of the second plurality of electrodes in order to excite at least some ions in at least one radial direction within the first electrode set and/or within the second electrode set and so that at least some ions are subsequently urged in the at least one axial direction and/or are ejected axially from the ion trap and/or are moved past the DC trapping field, the DC potential or the barrier field. The ions which are urged in the at least one axial direction and/or are ejected axially from the ion trap and/or are moved past the DC trapping field, the DC potential or the barrier field preferably move along an ion path formed within the second electrode set.

The second device is preferably arranged and adapted to apply a first phase and/or a second opposite phase of one or more excitation, AC or tickle voltages to at least some of the first plurality of electrodes and/or to at least some of the second plurality of electrodes in order to excite in a mass or mass to charge ratio selective manner at least some ions radially within the first electrode set and/or the second electrode set to increase in a mass or mass to charge ratio selective manner the radial motion of at least some ions within the first electrode set and/or the second electrode set in at, least one radial direction.

Preferably, the one or more excitation, AC or tickle voltages have an amplitude selected from the group consisting of (i) <50 mV peak to peak; (ii) 50-100 my peak to peak; (iii) 100-150 mV peak to peak; (iv) 150-200 mV peak to peak; (v) 200-250 mV peak to peak; (vi) 250-300 mV peak to peak; (vii) 300-350 mV peak to peak; (viii) 350-400 mV peak to peak; (ix) 400-450 mV peak to peak; (x) 450-500 mV peak to peak; and (xi) >500 mV peak to peak. Preferably, the one or more excitation. AC or tickle voltages have a frequency selected from the group consisting of: (i) <10 kHz; (ii) 10-20 kHz; (iii) 20-30 kHz; (iv) 30-40 kHz; (v) 40-50 kHz; (vi) 50-60 kHz; (vii) 60-70 kHz; (viii) 70-80 kHz; (ix) 80-90 kHz; (x) 90-100 kHz; (xi) 100-110 kHz; (xii) 110-120 kHz; (xiii) 120-130 kHz; (xiv) 130-140 kHz; (xv) 140-150 kHz; (xvi) 150-160 kHz; (xvii) 160-170 kHz; (xviii) 170-180 kHz; (xix) 180-190 kHz; (xx) 190-200 kHz; and (xxi) 200-250 kHz; (xxii) 250-300 kHz; (xxiii) 300-350 kHz; (xxiv) 350-400 kHz; (xxv) 400-450 kHz; (xxvi) 450-500 kHz; (xxvii) 500-600 kHz; (xxviii) 600-700 kHz; (xxix) 700-800 kHz; (xxx) 800-900 kHz; (xxxi) 900-1000 kHz; and (xxxii) >1 MHz.

According to the preferred embodiment the second device is arranged and adapted to maintain the frequency and/or amplitude and/or phase of the one or more excitation, AC or tickle voltages applied to at least some of the first plurality of electrodes and/or at least some of the second plurality of electrodes substantially constant.

According to the preferred embodiment the second device is arranged and adapted to vary, increase, decrease or scan the frequency and/or amplitude and/or phase of the one or more excitation, AC or tickle voltages applied to at least some of the first plurality of electrodes and/or at least some of the second plurality of electrodes.

The first electrode set preferably comprises a first central longitudinal axis and wherein;

(i) there is a direct line of sight along the first central longitudinal axis; and/or (ii) there is substantially no physical axial obstruction along the first central longitudinal axis; and/or (iii) ions transmitted, in use, along the first central longitudinal axis are transmitted with an ion transmission efficiency of substantially 100%.

The second electrode set preferably comprises a second central longitudinal axis and wherein;

(i) there is a direct line of sight along the second central longitudinal axis; and/or (ii) there is substantially no physical axial obstruction along the second central longitudinal axis; and/or (iii) ions transmitted, in use, along the second central longitudinal axis are transmitted with an ion transmission efficiency of substantially 100%.

According to the preferred embodiment the first plurality of electrodes have individually and/or in combination a first cross-sectional area and/or shape and wherein the second plurality of electrodes have individually and/or in combination a second cross-sectional area and/or shape, wherein the first cross-sectional area and/or shape is substantially the same as the second cross-sectional area and/or shape at one or more points along the axial length of the first electrode set and the second electrode set and/or wherein the first cross-sectional area and/or shape at the downstream end of the first plurality of electrodes is substantially the same as the second cross-sectional area and/or shape at the upstream end of the second plurality of electrodes.

According to a less preferred embodiment the first plurality of electrodes have individually and/or in combination a first cross-sectional area and/or shape and wherein the second plurality of electrodes have individually and/or in combination a second cross-sectional area and/or shape, wherein the ratio of the first cross-sectional area and/or shape to the second cross-sectional area and/or shape at one or more points along the axial length of the first electrode set and the second electrode set and/or at the downstream end of the first plurality of electrodes and at the upstream end of the second plurality of electrodes is selected from the group consisting of: (i) <0.50; (ii) 0.50-0.60; (iii) 0.60-0.70; (iv) 0.70-0.80; (v) 0.80-0.90; (vi) 0.90-1.00; (vii) 1.00-1.10; (viii) 1.10-1.20; (ix) 120-1.30; (x) 1.30-1.40; (xi) 1.40-1.50; and (xii) >1.50.

According to the preferred embodiment the ion trap preferably further comprises a first plurality of vane or secondary electrodes arranged between the first electrode set and/or a second plurality of vane or secondary electrodes arranged between the second electrode set.

The first plurality of vane or secondary electrodes and/or the second plurality of vane or secondary electrodes preferably each comprise a first group of vane or secondary electrodes arranged in a first plane and/or a second group of electrodes arranged in a second plane. The second plane is preferably orthogonal to the first plane.

The first groups of vane or secondary electrodes preferably comprise a first set of vane or secondary electrodes arranged on one side of the first longitudinal axis of the first electrode set and/or the second longitudinal axis of the second electrode set and a second set of vane or secondary electrodes arranged on an opposite side of the first longitudinal axis and/or the second longitudinal axis. The first set of vane or secondary electrodes and/or the second set of vane or secondary electrodes preferably comprises at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, 70, 75, 80, 85, 90, 95 or 100 vane or secondary electrodes.

The second groups of vane or secondary electrodes preferably comprise a third set of vane or secondary electrodes arranged on one side of the first longitudinal axis and/or the second longitudinal axis and a fourth set of vane or secondary electrodes arranged on an opposite side of the first longitudinal axis and/or the second longitudinal axis. The third set of vane or secondary electrodes and/or the fourth set of vane or secondary electrodes preferably comprises at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, 70, 75, 80, 85, 90, 95 or 100 vane or secondary electrodes.

Preferably, the first set of vane or secondary electrodes and/or the second set of vane or secondary electrodes and/or the third set of vane or secondary electrodes and/or the fourth set of vane or secondary electrodes are arranged between different pairs of electrodes forming the first electrode set and/or the second electrode set.

The ion trap preferably further comprises a fourth device arranged and adapted to apply one or more first DC voltages and/or one or more second DC voltages either: (i) to at least some of the vane or secondary electrodes; and/or (ii) to the first set of vane or secondary electrodes; and/or (iii) to the second set of vane or secondary electrodes; and/or (iv) to the third set of vane or secondary electrodes; and/or (v) to the fourth set of vane or secondary electrodes.

The one or more first DC voltages and/or the one or more second DC voltages preferably comprise one or more transient DC voltages or potentials and/or one or more transient DC voltage or potential waveforms.

The one or more first DC voltages and/or the one or more second DC voltages preferably cause:

(i) ions to be urged, driven, accelerated or propelled in an axial direction and/or towards an entrance or first region of the ion trap along at least a part of the axial length of the ion trap; and/or (ii) ions, which have been excited in at least one radial direction, to be urged, driven, accelerated or propelled in an opposite axial direction and/or towards an exit or second region of the ion trap along at least a part of the axial length of the ion trap.

The one or more first DC voltages and/or the one or more second DC voltages preferably have substantially the same amplitude or different amplitudes. The amplitude of the one or more first DC voltages and/or the one, or more second DC voltages are preferably selected from the group consisting of (i) <1 V; (ii) 1-2 V; (iii) 2-3 V; (iv) 3-4 V (v) 4-5 V; (vi) 5-6 V; (vii) 6-7 V; (viii) 7-8 V; (ix) 8-9 V; (x) 9-10 V; (xi) 10-15 V; (xi) 15-20 V; (xiii) 20-25 V; (xiv) 25-30 V; (xv) 30-35 V; (xvi) 35-40 V; (xvii) 40-45 V; (xviii) 45-50 V; and (xix) >50 V.

The second device is preferably arranged and adapted to apply a first phase and/or a second opposite phase of one or more excitation, AC or tickle voltages either; (i) to at least some of the vane or secondary electrodes: and/or (ii) to the first set of vane or secondary electrodes; and/or (iii) to the second set of vane or secondary electrodes; and/or (iv) to the third set of vane or secondary electrodes; and/or (v) to the fourth set of vane or secondary electrodes; in order to excite at least some ions in at least one radial direction within the first electrode set and/or the second electrode set and so that at least some ions are subsequently urged in the at least one axial direction and/or ejected axially from the ion trap and/or moved past the DC trapping field, the DC potential or the barrier field.

The ions which are urged in the at least one axial direction and/or are ejected axially from the ion trap and/or are moved past the DC trapping field, the DC potential or the barrier field preferably move along an ion path formed within the second electrode set.

According, to the preferred embodiment the second device is arranged and adapted to apply a first phase and/or a second opposite phase of one or more excitation, AC or tickle voltages either: (i) to at least some of the vane or secondary electrodes; and/or (ii) to the first set of vane or secondary electrodes; and/or (iii) to the second set of vane or secondary electrodes; and/or (iv) to the third set of vane or secondary electrodes; and/or (v) to the fourth set of vane or secondary electrodes;

in order to excite in a mass or mass to charge ratio selective manner at least some ions radially within the first electrode set and/or the second electrode set to increase in a mass or mass to charge ratio selective manner the radial motion of at least some ions within the first electrode set and/or the second electrode set in at least one radial direction.

Preferably, the one or more excitation, AC or tickle voltages have an amplitude selected from the group consisting of: (i) <50 mV peak to peak; (ii) 50-100 mV peak to peak; (iii) 100-150 my peak to peak; (iv) 150-200 my peak to peak; (v) 200-250 mV peak to peak; (vi) 250-300 mV peak to peak; (vii) 300-350 mV peak to peak; (viii) 350-400 mV peak to peak; (ix) 400-450 mV peak to peak; (x) 450-500 mV peak to peak; and (xi) >500 mV peak to peak.

Preferably, the one or more excitation, AC or tickle voltages have a frequency selected from the group consisting of (i) <10 kHz; (ii) 10-20 kHz; (iii) 20-30 kHz; (iv) 30-40 kHz; (v) 40-50 kHz; (vi) 50-60 kHz; (vii) 60-70 kHz; (viii) 70-80 kHz; (ix) 80-90 kHz; (x) 90-100 kHz; (xi) 100-110 kHz; (xii) 110-120 kHz; (xiii) 120-130 kHz; (xiv) 130-140 kHz; (xv) 140-150 kHz; (xvi) 150-160 kHz; (xvii) 160-170 kHz; (xviii) 170-180 kHz; (xix) 180-190 kHz; (xx) 190-200 kHz; and (W) 200-250 kHz; (xxii) 250-300 kHz; (xxiii) 300-350 kHz; (xxiv) 350-400 kHz; (xxv) 400-450 kHz; (xxvi) 450-500 kHz; (xxvii) 500-600 kHz; (xxviii) 600-700 kHz; (xxix) 700-800 kHz; (xxx) 800-900 kHz; (xxxi) 900-1000 kHz; and (xxxii) >1 MHz.

The second device may be arranged and adapted to maintain the frequency and/or amplitude and/or phase of the one or more excitation, AC or tickle voltages applied to at least some of the plurality of vane or secondary electrodes substantially constant.

The second device may be arranged and adapted to vary, increase, decrease or scan the frequency and/or amplitude and/or phase of the one or more excitation, AC or tickle voltages applied to at least some of the plurality of vane or secondary electrodes.

The first plurality of vane or secondary electrodes preferably have individually and/or in combination a first cross-sectional area and/or shape. The second plurality of vane or secondary electrodes preferably have individually and/or in combination a second cross-sectional area and/or shape. The first cross-sectional area and/or shape is preferably substantially the same as the second cross-sectional area and/or shape at one or more points along the length of the first plurality of vane or secondary electrodes and the second plurality of vane or secondary electrodes.

The first plurality of vane or secondary electrodes may have individually and/or in combination a first cross-sectional area and/or shape and wherein the second plurality of vane or secondary electrodes have individually and/or in combination a second cross-sectional area and/or shape. The ratio of the first cross-sectional area and/or shape to the second cross-sectional area and/or shape at one or more points along the length of the first plurality of vane or secondary electrodes and the second plurality of vane or secondary electrodes is selected from the group consisting of (i) <0.50; (ii) 0.50-0.60; (iii) 0.60-0.70; (iv) 0.70-0.80; (v) 0.80-0.90; (vi) 0.90-1.00; (vii) 1.00-1.10; (viii) 1.10-1.20; (ix) 1.20-1.30; (x) 1.30-1.40; (xi) 1.40-1.50; and (xii) >1.50.

The ion trap preferably further comprises a third device arranged and adapted to apply a first AC or RF voltage to the first electrode set and/or a second AC or RF voltage to the second electrode set. The first AC or RF voltage and/or the second AC or RF voltage preferably create a pseudo-potential well within the first electrode set and/or the second electrode set which acts to confine ions radially within the ion trap.

The first AC or RF voltage and/or the second AC or RF voltage preferably have an amplitude selected from the group consisting of; (1) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The first AC or RF voltage and/or the second AC or RF voltage preferably have a frequency selected from the group consisting of (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.6 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (m) >10.0 MHz.

According to the preferred embodiment the first AC or RF voltage and the second AC or RF voltage have substantially the same amplitude and/or the same frequency and/or the same phase.

According to a less preferred embodiment the third device may be arranged and adapted to maintain the frequency and/or amplitude and/or phase of the first AC or RF voltage and/or the second AC or RF voltage substantially constant.

According to the preferred embodiment the third device is arranged and adapted to vary, increase, decrease or scan the frequency and/or amplitude and/or phase of the first AC or RF voltage and/or the second AC or RF voltage.

According to an embodiment the second device is arranged and adapted to excite ions by resonance ejection and/or mass selective instability and/or parametric excitation.

The second device is preferably arranged and adapted to increase the radial displacement of ions by applying one or more DC potentials to at least some of the first plurality of electrodes and/or the second plurality of electrodes.

The ion trap preferably further comprises one or more electrodes arranged upstream and/or downstream of the first electrode set and/or the second electrode set, wherein in a mode of operation one or more DC and/or AC or RF voltages are applied to the one or more electrodes in order to confine at least some ions axially within the ion trap.

In a mode of operation at least some ions are preferably arranged to be trapped or isolated in one or more upstream and/or intermediate and/or downstream regions of the ion trap.

In a mode of operation at least some ions are preferably arranged to be fragmented in one or more upstream and/or intermediate and/or downstream regions of the ion trap. The ions are preferably arranged to be fragmented by: (i) Collisional Induced Dissociation ("CID"); (ii) Surface Induced Dissociation ("SID"); (iii) Electron Transfer Dissociation; (iv) Electron Capture Dissociation; (v) Electron Collision or Impact Dissociation; (vi) Photo Induced Dissociation ("PID"); (vii) Laser Induced Dissociation; (viii) infrared radiation induced dissociation; (ix) ultraviolet radiation induced dissociation (x) thermal or temperature dissociation; (xi) electric field induced dissociation; (xii) magnetic field induced dissociation; (xiii) enzyme digestion or enzyme degradation dissociation; (xiv) ion-ion reaction dissociation; (xv) ion-molecule reaction dissociation; (xvi) ion-atom reaction dissociation; (xvii) ion-metastable ion reaction dissociation; (xviii) ion-metastable molecule reaction dissociation; (xix) ion-metastable atom reaction dissociation; and (xx) Electron ionisation Dissociation ("EID").

According to an embodiment the ion trap is maintained, in a mode of operation, at a pressure selected from the group consisting of: (i) >100 mbar; (ii) >10 mbar; (iii) >1 mbar; (iv) >0.1 mbar; (v) >$10^{-2}$ mbar; (vi) >$10^{-3}$ mbar; (vii) >$10^{-4}$ mbar; (viii) >$10^{-5}$ mbar; (ix) >$10^{-6}$ mbar; (x) <100 mbar; (xi) <10 mbar (xii) <1 mbar; (xiii) <0.1 mbar; (xiv) <$10^{-2}$ mbar; (xv) <$10^{-3}$ mbar; (xvi) <$10^{-4}$ mbar; (xvii) <$10^{-5}$ mbar; (xviii) <$10^{-6}$ mbar; (xix) 10-100 mbar; (xx) 1-10 mbar; (xxi) 0.1-1 mbar; (xxii) $10^{-2}$ to $10^{-1}$ mbar; (xxiii) $10^{-3}$ to $10^{-2}$ mbar; (xxiv) $10^{-4}$ to $10^{-3}$ mbar; and (xxv) $10^{-5}$ to $10^{-4}$ mbar.

In a mode of operation at least some ions are preferably arranged to be separated temporally according to their ion mobility or rate of change of ion mobility with electric field strength as they pass along at least a portion of the length of the on trap.

According to an embodiment the ion trap preferably further comprises a device or ion gate for pulsing ions into the ion trap and/or for converting a substantially continuous ion beam into a pulsed ion beam.

According to an embodiment the first electrode set and/or the second electrode set are axially segmented in a plurality of axial segments or at least 2, 3, 4, 5, 6, 7, 8, 9, 10, 11, 12, 13, 14, 15, 16, 17, 18, 19 or 20 axial segments. In a mode of operation at least some of the plurality of axial segments are preferably maintained at different DC potentials and/or wherein one or more transient DC potentials or voltages or one or more transient DC potential or voltage waveforms are applied to at least some of the plurality of axial segments so that at least some ions are trapped in one or more axial DC potential wells and/or wherein at least some ions are urged in a first axial direction and/or a second opposite axial direction.

in a mode of operation: (i) ions are ejected substantially adiabatically from the ion trap in an axial direction and/or without substantially imparting axial energy to the ions; and/or (Ii) ions are ejected axially from the ion trap in an axial direction with a mean axial kinetic energy in a range selected from the group consisting of: (i) <1 eV; (ii) 1-2 eV; (iii) 2-3 eV; (iv) 3-4 eV; (v) 4-5 eV; (vi) 5-6 eV; (vii) 6-7 eV; (viii) 7-8 eV; (ix) 8-9 eV; (x) 9-10 eV; (xi) 10-15 eV; (xii) 15-20 eV; (xiii) 20-25 eV; (xiv) 25-30 eV; (xv) 30-35 eV; (xvi) 35-40 eV; and (xvii) 40-45 eV; and/or (iii) ions are ejected axially from the ion trap in an axial direction and wherein the standard deviation of the axial kinetic energy is in a range selected from the group consisting of: (i) <1 eV; (ii) 1-2 eV; (iii) 2-3 eV; (iv) 3-4 eV; (v) 4-5 eV; (vi) 5-6 eV; (vii) 6-7 eV; (viii) 7-8 eV; (ix) 8-9 eV; (x) 9-10 eV; (xi) 10-15 eV; (xii) 15-20 eV; (xiii) 20-25 eV; (xiv) 25-30 eV; (xv) 30-35 eV; (xvi) 35-40 eV; (xvii) 40-45 eV; and (xviii) 45-50 eV.

According to an embodiment in a mode of operation multiple different species of ions having different mass to charge ratios are simultaneously ejected axially from the ion trap in substantially the same and/or substantially different axial directions.

In a mode of operation an additional AC voltage may be applied to at least some of the first plurality of electrodes and/or at least some of the second plurality of electrodes. The one or more DC voltages are preferably modulated on the additional AC voltage so that at least some positive and negative ions are simultaneously confined within the ion trap and/or simultaneously ejected axially from the ion trap. Preferably, the additional AC voltage has an amplitude selected from the group consisting of: (i) <1 V peak to peak (ii) 1-2 V peak to peak; (iii) 2-3 V peak to peak; (iv) 3-4 V peak to peak; (v) 4-5 V peak to peak; (vi) 5-6 V peak to peak; (vii) 6-7 V peak to peak; (viii) 7-8 V peak to peak; (ix) 8-9 V peak to peak; (x) 9-10 V peak to peak; and (xi) >10 V peak to peak. Preferably, the additional AC voltage has a frequency selected from the group consisting of: (i) <10 kHz; (ii) 10-20 kHz; (iii) 20-30 kHz; (iv) 30-40 kHz; (v) 40-50 kHz; (vi) 50-60 kHz; (vii) 60-70 kHz; (viii) 70-80 kHz; (ix) 80-90 kHz (x) 90-100 kHz; (xi) 100-110 kHz; (xii) 110-120 kHz; (xiii) 120-130 kHz; (xiv) 130-140 kHz; (xv) 140-150 kHz; (xvi) 150-160 kHz; (xvii) 160-170 kHz; (xviii) 170-180 kHz; (xix) 180-190 kHz; (xx) 190-200 kHz; and (xxi) 200-250 kHz; (xxii) 250-300 kHz; (xxiii) 300-350 kHz; (xxiv) 350-400 kHz; (xxv) 400-450 kHz; (xxvi) 450-500 kHz; (xxvii) 500-600 kHz; (xxviii) 600-700 kHz; (xxix) 700-800 kHz; (xxx) 800-900 kHz; (xxxi) 900-1000 kHz; and (xxxii) 1 MHz.

The ion trap is also preferably arranged and adapted to be operated in at least one non-trapping mode of operation wherein either:

(i) DC and/or AC or RF voltages are applied to the first electrode set and/or to the second electrode set so that the ion trap operates as an RF-only ion guide or ion guide wherein ions are not confined axially within the ion guide; and/or (ii) DC and/or AC or RF voltages are applied to the first electrode set and/or to the second electrode set so that the ion trap operates as a mass filter or mass analyser in order to mass selectively transmit some ions whilst substantially attenuating other ions.

According to a less preferred embodiment in a mode of operation ions which are not desired to be axially ejected at an instance in time may be radially excited and/or ions which are desired to be axially ejected at an instance in time are no longer radially excited or are radially excited to a lesser degree.

Ions which are desired to be axially ejected from the ion trap at an instance in time are preferably mass selectively ejected from the on trap and/or ions which are not desired to be axially ejected from the ion trap at the instance in time are preferably not mass selectively ejected from the ion trap.

According to the preferred embodiment the first electrode set preferably comprises a first multipole rod set (e.g. a quadrupole rod set) and the second electrode set preferably comprises a second multipole rod set (e.g. a quadrupole rod set). Substantially the same amplitude and/or frequency and/or phase of an AC or RF voltage is preferably applied to the first multipole rod set and to the second multipole rod set in order to confine ions radially within the first multipole rod set and/or the second multipole rod set.

According to an aspect of the present invention there is provided an ion trap comprising:

a first device arranged and adapted to create a first DC electric field which acts to confine ions having a first radial displacement axially within the ion trap and a second DC electric field which acts to extract or axially accelerate ions having a second radial displacement from the on trap; and a second device arranged and adapted to mass selectively vary, increase, decrease or scan the radial displacement of at least some ions so that the ions are ejected axially from the on trap whilst other ions remains confined axially within the ion trap.

According to an aspect of the present invention there is provided a mass spectrometer comprising an ion trap as described above.

The mass spectrometer preferably further comprises either:

(a) an ion source arranged upstream of the ion trap, wherein the ion source is selected from the group consisting of: (i) an Electrospray ionisation ("ESI") ion source; (ii) an Atmospheric Pressure Photo Ionisation ("APR") ion source; (iii) an Atmospheric Pressure Chemical Ionisation ("APCI") on source; (iv) a Matrix Assisted Laser Desorption Ionisation ("MALDI") ion source; (v) a Laser Desorption ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source (x) a Field Ionisation ("FI") ion source; (xi) a Field Desorption ("FD") on source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray ionisation ("DESI") ion source; (xvi) a Nickel-63 radioactive on source: (xvii) an Atmospheric Pressure Matrix Assisted Laser Desorption Ionisation ion source; and (xviii) a Thermospray ion source; and/or (b) one or more ion guides arranged upstream and/or downstream of the ion trap; and/or (c) one or more ion mobility separation devices and/or one or more Field Asymmetric Ion Mobility Spectrometer devices arranged upstream and/or downstream of the ion trap; and/or (d) one or more ion traps or one or more ion trapping regions arranged upstream and/or downstream of the ion trap; and/or (e) one or more collision, fragmentation or reaction cells arranged upstream and/or downstream of the ion trap, wherein the one or more collision, fragmentation or reaction cells are selected from the group consisting of: (i) a Collisional Induced Dissociation ("CID") fragmentation device; (ii) a Surface Induced Dissociation ("SID") fragmentation device; (iii) an Electron Transfer Dissociation fragmentation device; (iv) an Electron Capture Dissociation fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an ion-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvi) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) anion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device and/or (f) a mass analyser selected from the group consisting, of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICI") mass analyser; (viii) a Fourier Transform Ion Cyclotron Resonance ("FTICR") mass analyser: (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (g) one or more energy analysers or electrostatic energy analysers arranged upstream and/or downstream of the ion trap; and/or (h) one or more ion detectors arranged upstream and/or downstream of the ion trap; and/or (i) one or more mass filters arranged upstream and/or downstream of the ion trap, wherein the one or more mass filters are selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; and (vii) a Time of Flight mass filter.

According to an aspect of the present invention there is provided a dual mode device comprising:

a first electrode set and a second electrode set;

a first device arranged and adapted to create a DC potential field at a position along the ion trap which acts to confine ions having a first radial displacement axially within the ion trap and to extract ions having a second radial displacement from the ion trap when the dual mode device is operated in a first mode of operation;

a second device arranged and adapted to mass selectively vary, increase, decrease or scan the radial displacement of at least some ions so that at least some ions are ejected axially from the on trap whilst other ions remain confined axially within the ion trap when the dual mode device is operated in the first mode of operation; and a third device arranged and adapted to apply DC and/or RE voltages to the first electrode set and/or to the second electrode set so that when the dual mode device is operated in a second mode of operation the dual mode device operates either as a mass filter or mass analyser or as an RF-only ion guide wherein ions are transmitted onwardly without being confined axially.

According to an aspect of the present invention there is provided a method of trapping ions comprising:

providing a first electrode set comprising a first plurality of electrodes and a second electrode set comprising a second plurality of electrodes;

applying one or more DC voltages to one or more of the first plurality of electrodes and/or to one or more of the second plurality electrodes so that ions having a radial displacement within a first range experience a DC trapping field, a DC potential barrier or a barrier field which acts to confine at least some of the ions in at least one axial direction within the ion trap and wherein ions having a radial displacement within a second different range experience either:

(i) a substantially zero DC trapping field, no DC potential barrier or no barrier field so that at least some of the ions are not confined in the at least one axial direction within the ion trap; and/or (ii) a DC extraction field, an accelerating DC potential difference or an extraction field which acts to extract or accelerate at least some of the ions in the at least one axial direction and/or out of the ion trap; and varying, increasing, decreasing or altering the radial displacement of at least some ions within the ion trap.

According to an aspect of the present invention there is provided a method of mass spectrometry comprising a method of trapping ions as described above.

According to an aspect of the present invention there is provided a computer program executable by the control system of a mass spectrometer comprising an ion trap, the computer program being arranged to cause the control system:

(i) to apply one or more DC voltages to one or more electrodes of the ion trap so that ions having a radial displacement within a first range within the ion trap experience a DC trapping field, a DC potential barrier or a barrier field which acts to confine at least some of the ions in at least one axial direction within the ion trap and wherein ions having a radial displacement within a second different range experience either: (a) a substantially zero DC trapping field, no DC potential barrier or no barrier field so that at least some of the ions are not confined in the at least one axial direction within the ion trap; and/or (b) a DC extraction field, an accelerating DC potential difference or an extraction field which acts to extract or accelerate at least some of the ions in the at least one axial direction and/or out of the ion trap; and (ii) to vary, increase, decrease or alter the radial displacement of at least some ions within the ion trap.

According to an aspect of the present invention there is provided a computer readable medium comprising computer executable instructions stored on the computer readable medium, the instructions being arranged to be executable by a control system of a mass spectrometer comprising an ion trap in order to cause the control system:

(i) to apply one or more DC voltages to one or more electrodes of the ion trap so that ions having a radial displacement within a first range within the ion trap experience a DC trapping field, a DC potential barrier or a barrier field which acts to confine at least some of the ions in at least one axial direction within the ion trap and wherein ions having a radial displacement within a second different range experience either: (a) a substantially zero DC trapping field, no DC potential barrier or no barrier field so that at least some of the ions are not confined in the at least one axial direction within the ion trap; and/or (b) a DC extraction field, an accelerating DC potential difference or an extraction field which acts to extract or accelerate at least some of the ions in the at least one axial direction and/or out of the ion trap; and (ii) to vary, increase, decrease or alter the radial displacement of at least some ions within the ion trap.

The computer readable medium is preferably selected from the group consisting of (i) a ROM; (ii) an EAROM; (iii) an EPROM; (iv) an EEPROM; (v) a flash memory; and (vi) an optical disk.

According to an aspect of the present invention there is provided an ion trap comprising:

a first electrode set comprising a first plurality of electrodes having a first longitudinal axis;

a second electrode set comprising a second plurality of electrodes having a second longitudinal axis, the second electrode set being arranged downstream of the first electrode set;

a first device arranged and adapted to apply one or more DC voltages to one or more of the second plurality of electrodes so as to create, in use, a barrier field having a potential which decreases with increasing radius or displacement in a first radial direction away from the second longitudinal axis; and a second device arranged and adapted to excite at least some ions within the first electrode set in at least one radial direction and/or to increase the radial displacement of at least some ions in at least one radial direction within the first electrode set.

According to an aspect of the present invention there is provided an ion trap comprising:

a plurality of electrodes;

a first device arranged and adapted to apply one or more DC voltages to one or more of the plurality electrodes to create a DC field which acts to confine axially at least some ions having a first radial displacement and which acts to extract axially at least some ions having a second radial displacement.

The ion trap preferably further comprises a second device arranged and adapted to excite at least some ions so that the radial displacement of at least some of the ions is varied, increased, decreased or altered so that at least some of the ions are extracted axially from the ion trap.

According to an aspect of the present invention there is provided an ion trap comprising:

a plurality of electrodes;

a device arranged and adapted to maintain a positive DC electric field across a first region of the ion trap so that positive ions in the first region are prevented from exiting the ion trap in an axial direction and wherein the device is arranged and adapted to maintain a zero or negative DC electric field across a second region of the ion trap so that positive ions in the second region are free to exit the ion trap in a the axial direction or are urged, attracted or extracted out of the ion trap in the axial direction.

According to an aspect of the present invention there is provided an ion trap comprising:

a plurality of electrodes;

a device arranged and adapted to maintain a negative DC electric field across a first region of the ion trap so that negative ions in the first region are prevented from exiting the ion trap in an axial direction and wherein the device is arranged and adapted to maintain a zero or positive DC electric field across a second region of the ion trap so that negative ions in the second region are free to exit the ion trap in a the axial direction or are urged, attracted or extracted out of the ion trap in a the axial direction.

According to an aspect of the present invention there is provided an ion trap wherein in a mode of operation ions are ejected substantially adiabatically from the ion trap in an axial direction.

According to the preferred embodiment ions within the ion trap immediately prior to being ejected axially have a first average energy E1 and wherein the ions immediately after being ejected axially from the ion trap have a second average energy E2, wherein E1 substantially equals E2. Preferably, ions within the ion trap immediately prior to being ejected axially have a first range of energies and wherein the ions immediately after being ejected axially from the ion trap have a second range of energies, wherein the first range of energies substantially equals the second range of energies. Preferably, ions within the ion trap immediately prior to being ejected axially have a first energy spread ΔE1 and wherein the ions immediately after being ejected axially from the ion trap have a second energy spread ΔE2, wherein ΔE1 substantially equals ΔE2.

According to an aspect of the present invention there is provided an ion trap wherein in a mode of operation a radially dependent axial DC barrier is created at an exit region of the ion trap, wherein the DC barrier is non-zero, positive or negative at a first radial displacement and is substantially zero, negative or positive at a second radial displacement.

According to an aspect of the present invention there is provided an ion trap comprising:

a first device arranged and adapted to create:

(i) a first axial DC electric field which acts to confine axially ions having a first radial displacement within the ion trap; and (ii) a second axial DC electric field which acts to extract or axially accelerate ions having a second radial displacement from the ion trap; and a second device arranged and adapted to mass selectively vary, increase, decrease or scan the radial displacement of at least some ions so that the ions are ejected axially from the ion trap whilst other ions remains confined axially within the ion trap.

According to an aspect of the present invention there is provided a mass spectrometer comprising a device comprising an RF ion guide having substantially no physical axial obstructions and configured so, that an applied electrical field is switched, in use, between at least two modes of operation or states, wherein in a first mode of operation or state the device onwardly transmits ions within a mass or mass to charge ratio range and wherein in a second mode of operation or state the device acts as a linear ion trap wherein ions are mass selectively displaced in at least one radial direction and are ejected adiabatically in an axial direction by means of one or more radially dependent axial DC barrier.

According to an aspect of the present invention there is provided an ion trap wherein in a mode of operation ions are ejected axially from the ion trap in an axial direction with a mean axial kinetic energy in a range selected from the group consisting (i) <1 eV; (ii) 1-2 eV; (iii) 2-3 eV; (iv) 3-4 eV (v) 4-5 eV; (vi) 5-6 eV; (vii) 6-7 eV; (viii) 7-8 eV; (ix) 8-9 eV; (x) 9-10 eV; (xi) 10-15 eV; (xii) 15-20 eV; (xiii) 20-25 eV; (xiv) 25-30 eV; (xv) 30-35 eV; (xvi) 35-40 eV; and (xvii) 40-45 eV.

According to an aspect of the present invention there is provided an ion trap wherein in a mode of operation ions are ejected axially from the ion trap in an axial direction and wherein the standard deviation of the axial kinetic energy is in a range selected from the group consisting of: (i) <1 eV; (ii) 1-2 eV; (iii) 2-3 eV; (iv) 3-4 eV; (v) 4-5 eV; (vi) 5-6 eV (vii) 6-7 eV; (viii) 7-8 eV (ix) 8-9 eV; (x) 9-10 eV; (xi) 10-15 eV; (xii) 15-20 eV; (xiii) 20-25 eV; (xiv) 25-30 eV; (xv) 30-35 eV; (xvi) 35-40 eV; (xvii) 40-45 eV; and (xviii) 45-50 eV.

According to an aspect of the present invention there is provided an ion trap comprising:

a first multipole rod set comprising a first plurality of rod electrodes;

a second multipole rod set comprising a second plurality of rod electrodes;

a first device arranged and adapted to apply one or more DC voltages to one or more of the first plurality of rod electrodes and/or to one or more of the second plurality rod electrodes so that:

(a) ions having a radial displacement within a first range experience a DC trapping field, a DC potential barrier or a barrier field which acts to confine at least some of the ions in at least one axial direction within the ion trap; and (b) ions having a radial displacement within a second different range experience either: (i) a substantially zero DC trapping field, no DC potential barrier or no barrier field so that at least some of the ions are not confined in the at least one axial direction within the ion trap; and/or (ii) a DC extraction field, an accelerating DC potential difference or an extraction field which acts to extract or accelerate at least some of the ions in the at least one axial direction and/or out of the ion trap; and a second device arranged and adapted to vary, increase, decrease or alter the radial displacement of at least some ions within the ion trap.

The ion trap preferably further comprises:

a first plurality of vane or secondary electrodes arranged between the rods forming the first multipole rod set; and/or a second plurality of vane or secondary electrodes arranged between the rods forming the second multipole rod set.

According to an embodiment of the present invention a mass spectrometer is provided comprising a relatively high-transmission RF ion guide or ion trap. The ion guide or ion trap is particularly advantageous in that the central longitudinal axis of the ion trap is not obstructed by electrodes. This is in contrast to a known ion trap wherein crosswire electrodes are provided which pass across the central longitudinal axis of the ion trap and hence significantly reduce ion transmission through the ion trap.

The preferred device may be operated as a dual mode device and may be switched between at least two different modes of operation or states. For example, in a first mode of operation or state the preferred device may be operated as a conventional mass filter or mass analyser so that only ions having a particular mass or mass to charge ratio or ions having mass to charge ratios within a particular range are transmitted onwardly. Other ions are preferably substantially attenuated. In a second mode of operation or state the preferred device may be operated as a linear ion trap wherein ions are preferably mass selectively displaced in at least one radial direction and ions are then preferably subsequently mass selectively ejected adiabatically axially past a radially dependant axial DC potential barrier.

The preferred ion trap preferably comprises an RF ion guide or RF rod set. The ion trap preferably comprises two quadrupole rod sets arranged co-axially and in close proximity to or adjacent to each other. A first quadrupole rod set is preferably arranged upstream of a second quadrupole rod set. The second quadrupole rod set is preferably substantially shorter than the first quadrupole rod set.

According to the preferred embodiment one or more radially dependent axial DC potential barriers are preferably created at at least one end of the preferred device. The one or more axial DC potential barriers are preferably created by applying one or more DC potentials to one or more of the rods forming the second quadrupole rod set. The axial position of the one or more radially dependent DC potential barriers preferably remains substantially fixed whilst ions are being ejected from the ion trap. However, other less preferred embodiments are contemplated wherein the axial position of the one or more radially dependent DC potential barriers may be varied with time.

According to the preferred embodiment the amplitude of the one or more axial DC potential barriers preferably remains substantially fixed. However, other less preferred embodiments are contemplated wherein the amplitude of the one or more axial DC potential barriers may be varied with time.

The amplitude of the barrier field preferably varies in a first radial direction so that the amplitude of the axial DC potential barrier preferably reduces with increasing radius in the first radial direction. The amplitude of the axial DC potential barrier also preferably varies in a second different (orthogonal) radial direction so that the amplitude of the axial DC potential barrier preferably increases with increasing radius in the second radial direction.

Ions within the preferred on trap are preferably mass selectively displaced in at least one radial direction by applying or creating a supplementary time varying field within the ion guide or ion trap. The supplementary time varying field preferably comprises an electric field which is preferably created by applying a supplementary AC voltage to one of the pairs of electrodes forming the RF ion guide or ion trap.

According to an embodiment one or more ions are preferably mass selectively displaced radially by selecting or arranging for the frequency of the supplementary time varying field to be close to or to substantially correspond with a mass dependent characteristic frequency of oscillation of one or more ions within the ion guide.

The mass dependent characteristic frequency preferably relates to, corresponds with or substantially equals the secular frequency of one or more ions within the ion trap. The secular frequency of an ion within the preferred device is a function of the mass to charge ratio of the ion. The secular frequency may be approximated by the following equation for an RF only quadrupole:

$$\omega(m/z) \approx \frac{\sqrt{2}\, zeV}{mR_0^2\Omega} \tag{1}$$

wherein m/z is the mass to charge ratio of an ion, e is the electronic charge, V is the peak RF voltage, $R_0$ is the inscribed radius of the rod set and Ω is the angular frequency of the RF voltage.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENTS

Figure 1:
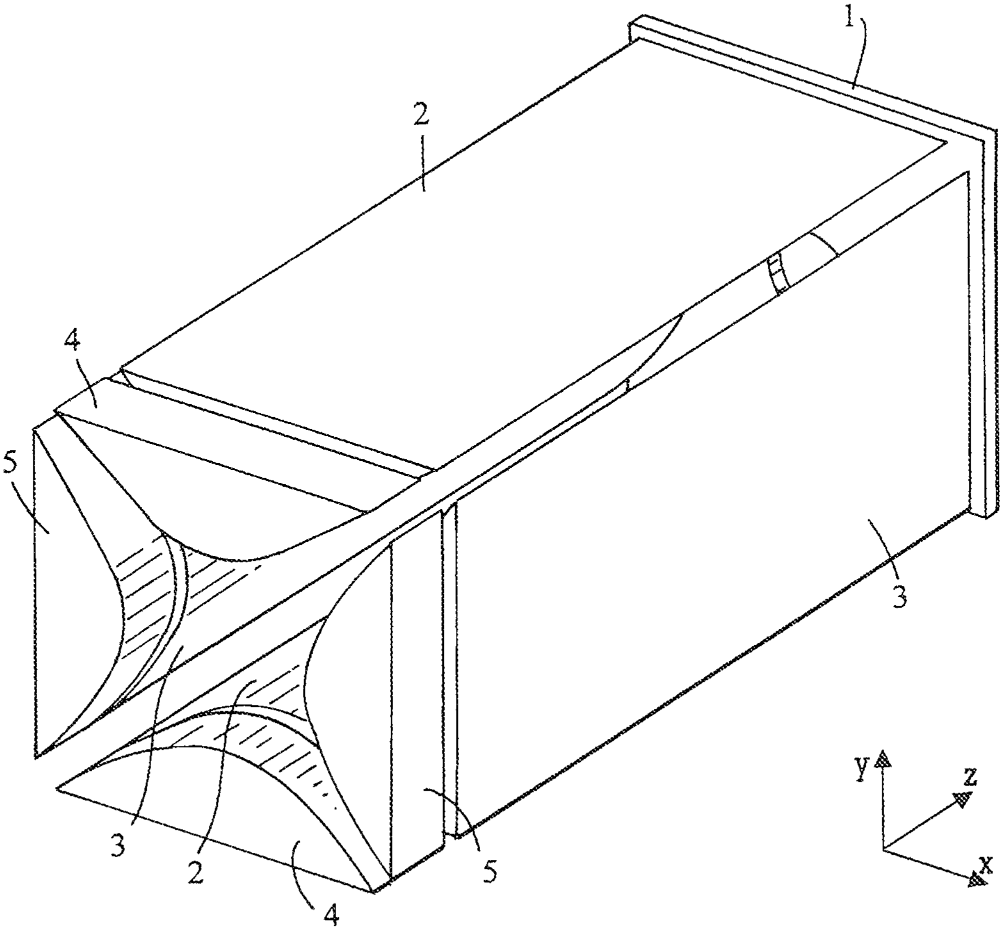
FIG. 1 shows a schematic of an ion trap according to a preferred embodiment of the present invention.

An embodiment of the present invention will now be described with reference to FIG. 1. An ion trap is preferably provided comprising one or more an entrance electrodes 1, a first main quadrupole rod set comprising two pairs of hyperbolic electrodes 2,3 and a short second quadrupole rod set (or post-filter) arranged downstream of the main quadrupole rod set. The second shorter quadrupole rod set preferably comprises two pairs of hyperbolic electrodes 4,5 which can be considered as forming two pairs of ejection electrodes 4,5. The short second quadrupole rod set 4,5 or post-filter is preferably arranged to support axial ejection of ions from the ion trap.

In a mode of operation, ions are preferably pulsed into the ion trap in a periodic manner by pulsing the entrance electrode 1 or another ion-optical component such as an ion gate (not shown) which is preferably arranged upstream of the ion trap. Ions which are pulsed into the ion trap are preferably confined radially within the ion trap due to the application of an RF voltage to the two pairs of electrodes 2,3 which preferably from the first main quadrupole rod set. Ions are preferably confined radially within the ion trap within a pseudo-potential well. One phase of the applied RF voltage is preferably applied to one pair 2 of the rod electrodes whilst the opposite phase of the applied RF voltage is preferably applied to the other pair 3 of the rod electrodes forming the first main quadrupole rod set. Ions are preferably confined axially within the ion trap by applying a DC voltage to the entrance electrode 1 once ions have entered the ion trap and by also applying a DC voltage to at least one of the pairs of ejection electrodes 4; 5 arranged at the exit of the ion trap. The two pairs of ejection electrodes 4,5 are preferably maintained at the same RF voltage as the rod electrodes 2,3 forming the main quadrupole rod set. The amplitude and frequency of the RF voltage applied to the main rod electrodes 2,3 and to the exit electrodes 4,5 is preferably the same. Ions are therefore preferably confined both radially and axially within the ion trap.

Ions within the ion trap preferably lose kinetic energy due to collisions with background gas present within the ion trap so that after a period of time ions within the ion trap can be considered as being at thermal energies. As a result, ions preferably form an ion cloud along the central axis of ion trap.

The ion trap may be operated in a variety of different modes of operation. The device is preferably arranged to be operated as a mass or mass to charge ratio selective ion trap. In this mode of operation one or more DC voltages are preferably applied to at least one of the pairs of exit or ejection electrodes 4,5 arranged at the exit of the ion trap. The application of one or more DC voltages to at least one of the pairs of ejection electrodes 4,5 preferably results in a radially dependent axial DC potential barrier being produced or created at the exit region of the ion trap. The form of the radially dependent axial DC potential barrier will now be described in more detail with reference to FIG. 2.

Figure 2:
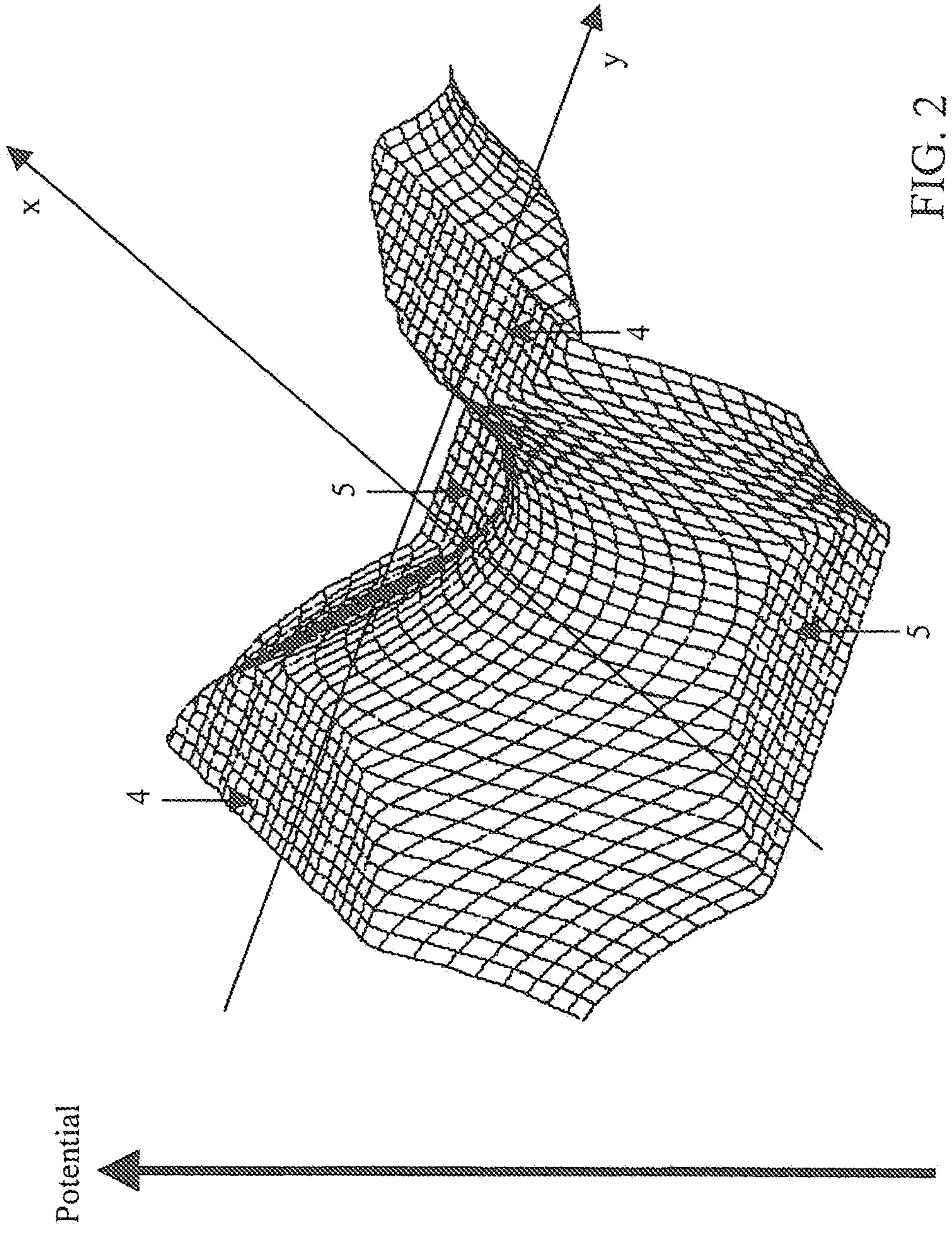
FIG. 2 shows a potential energy plot between exit electrodes arranged at the exit of an ion trap according to embodiment of the present invention and shows an example of a radially dependent axial DC potential.

FIG. 2 shows a potential surface which is generated between the two pairs of exit electrodes 4,5 according to an embodiment wherein a voltage of +4 V with respect to the DC bias applied to the main rod electrode electrodes 2,3 was applied to one of the pairs 4 of end electrodes. A voltage of −3 V with respect to the DC bias applied to the main rod electrodes 2,3 was applied to the other pair 5 of end electrodes.

The combination of two different DC voltages which were applied to the two pairs of end or exit electrodes 4,5 preferably results in an on-axis potential barrier of +0.5 V being created along the central longitudinal axis at the exit of the ion trap. The DC potential barrier is preferably sufficient to trap positively charged ions (i.e. cations) axially within the ion guide at thermal energies. As is shown in FIG. 2, the axial trapping potential preferably increases with radius in the y-radial direction but decreases with radius in the x-radial direction.

Figure 3:
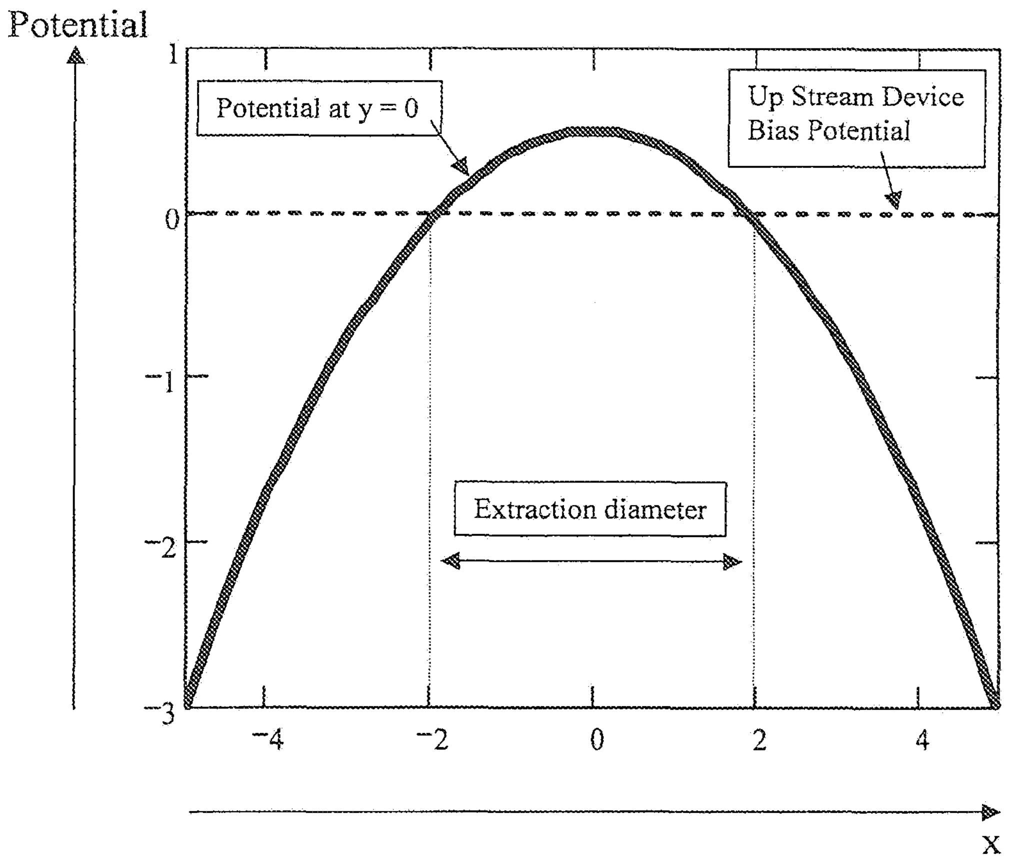
FIG. 3 shows a section through the potential energy plot shown in FIG. 2 along the line y=0 and at a position half way between the two y-electrodes.

FIG. 3 shows how the radially dependent DC potential varies with radius in the x direction when y equals zero in the standard coordinate system (i.e. along a line half way between the y electrodes). The on-axis potential at x=0, y=0 is +0.5 V and it is apparent that the potential decreases quadratically as the absolute value of x increases. The potential remains positive and therefore has the effect of confining positively charged ions axially within the ion trap so long as the ions do not move radially more than approximately 2 mm in the x radial direction. At a radius of 2 mm the DC potential falls below that of the DC bias potential applied to the two pairs of hyperbolic rod electrodes 2,3 forming the main quadrupole rod set. As a result, ions having a radial motion greater than 2 mm in the x direction will now experience an extraction field when in proximity to the extraction or exit electrodes 4,5 arranged at the exit region of the ion trap. The extraction field preferably acts to accelerate ions which have a radial motion greater than 2 mm axially out of the ion trap.

One way of increasing the radial motion of ions within the ion trap in the x-direction (so that the ions then subsequently experience an axial extraction field) is to apply, a small AC voltage (or tickle voltage) between one of the pairs of rod electrodes 3 which form the main quadrupole rod set 2,3. The AC voltage applied to the pair of electrodes 3 preferably produces an electric field in the x-direction between the two rod electrodes 3. The electric field preferably affects the motion of ions between the electrodes 3 and preferably causes ions to oscillate at the frequency of the applied AC field in the x-direction. If the frequency of the applied AC field matches the secular frequency of ions within the preferred device (see Eqn. 1 above) then these ions will then preferably become resonant with the applied field. When the amplitude of ion motion in the x-direction becomes larger than the width of the axial potential barrier in the x-direction then the ions are no longer confined axially within the ion trap. Instead, the ions experience an extraction field and are ejected axially from the ion trap.

An RF voltage is preferably applied to the end electrodes 4,5 so that when ions are ejected axially from the ion trap the ions remain confined radially.

The position of the radially dependent axial DC potential barrier preferably remains fixed. However, other less preferred embodiments are contemplated wherein the position of the radially dependent axial barrier may vary with time to effect ejection or onward transport of ions having specific mass to charge ratios or mass to charge ratios within certain ranges.

Figure 4:
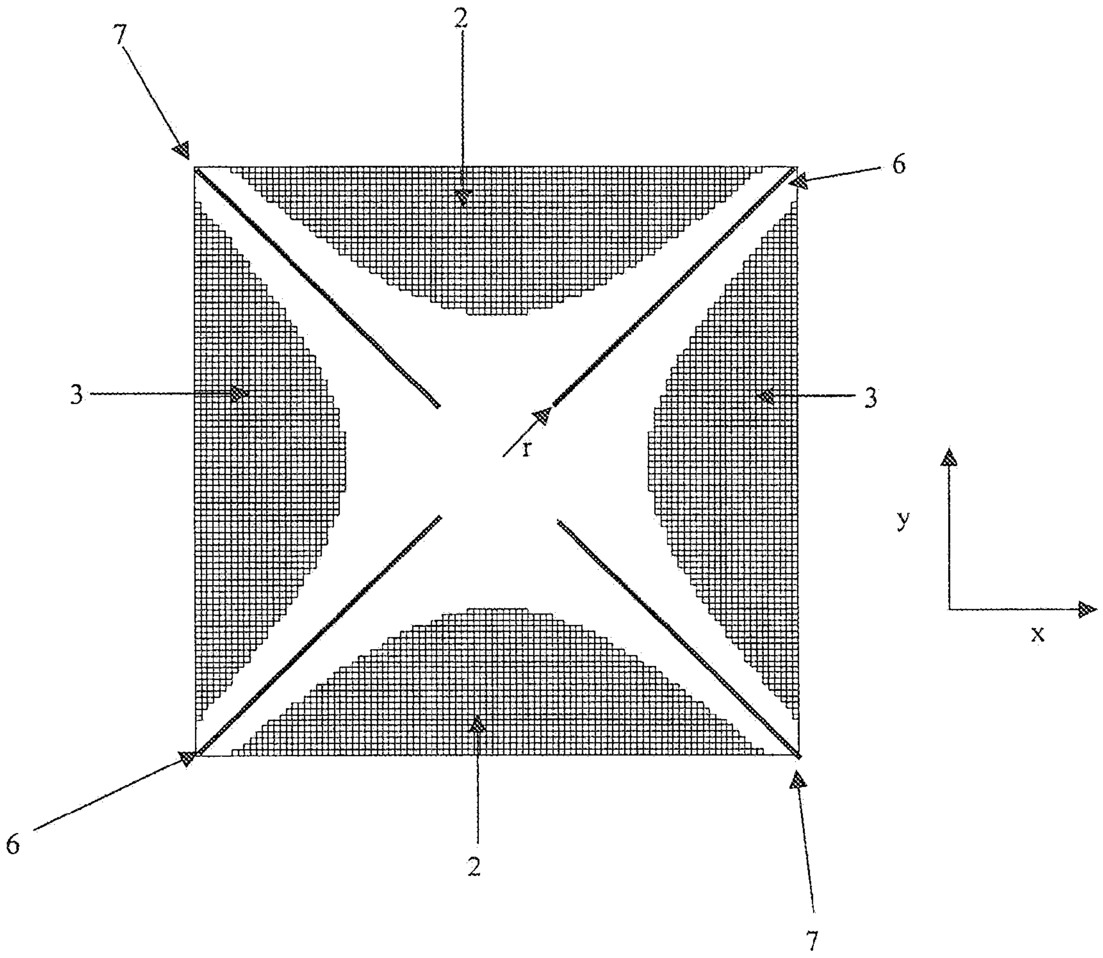
FIG. 4 shows a schematic of an ion trap according to another embodiment wherein axially segmented vane electrodes are provided between neighbouring rod electrodes.

An ion trap according to another embodiment of the present invention is shown in FIG. 4. According to this embodiment the ion trap preferably further comprises a plurality of axially segmented vane electrodes 6,7. FIG. 4 shows a section through an ion trap in the x,y plane and shows how two pairs of vane electrodes 6,7 may be provided between the main rod electrodes 2,3 forming the ion trap. The vane electrodes 6,7 are preferably positioned so as to lie in two different planes of zero potential between the hyperbolic rod electrodes 2,3. The vane electrodes 6,7 preferably cause only minimal distortion of the fields within the ion trap.

One pair of vane electrodes 6 is preferably arranged to lie in the x=y plane and the other pair of vane electrodes 7 is preferably arranged to lie in the x=−y plane. Both pairs of vane electrodes 6,7 preferably terminate before the central axis of the ion trap at an inscribed radius r. Therefore, the axial ion guiding region along the central longitudinal axis of the ion trap preferably remains unrestricted or unobstructed (i.e. there is preferably a clear line of sight along the central axis of the ion trap). In contrast, a known ion trap has crosswire electrodes which are provided across the central longitudinal axis of the ion trap with the result that ion transmission through the ion trap is reduced.

Figure 5:
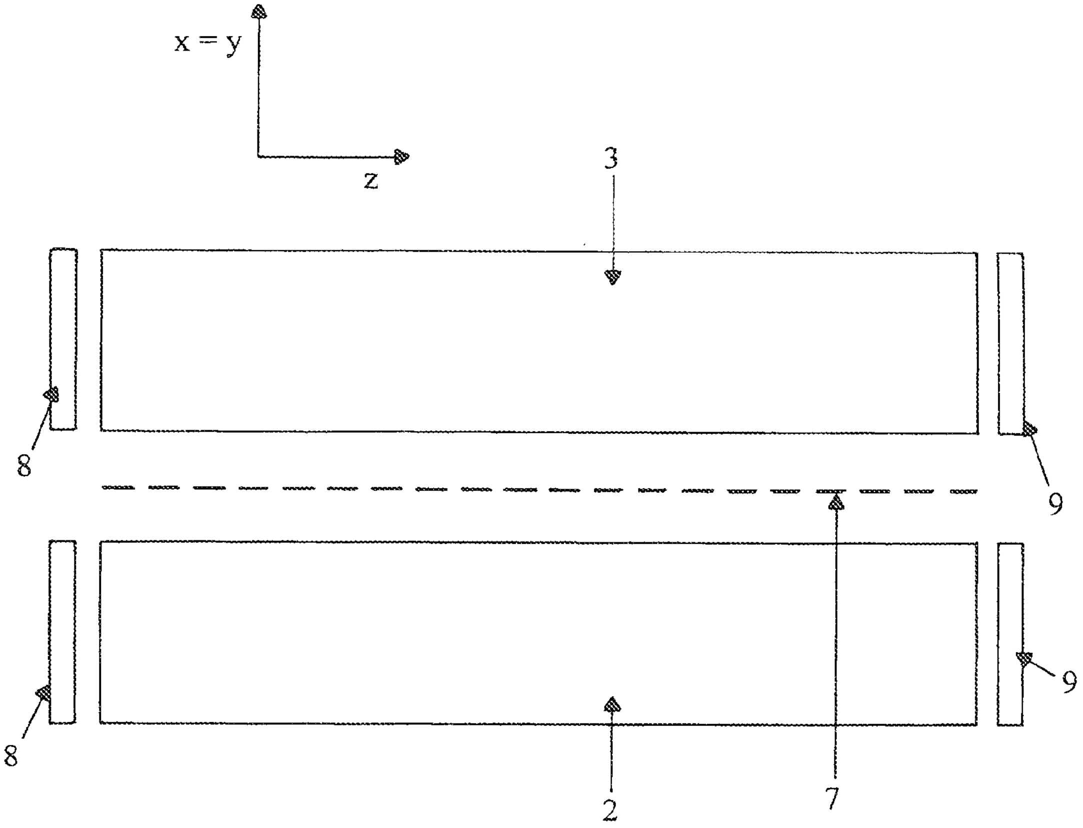
FIG. 5 shows the embodiment shown in FIG. 4 in the (x=y), z plane and shows how the vane electrodes are preferably segmented in the axial direction.

FIG. 5 shows the ion trap shown in FIG. 4 in the (x=y), z plane. Ions which enter the ion trap are preferably confined radially by a pseudo-potential field resulting from the application of an RF voltage to the main rod electrodes 2,3. Ions are preferably confined in the axial direction by DC potentials which are preferably applied to one or more entrance electrode(s) 8 and to the exit electrodes 9. The one or more entrance electrodes 8 are preferably arranged at the entrance of the on trap and the exit electrodes 9 are preferably arranged at the exit of the ion trap.

The vane electrodes 6 which are arranged in the x y plane and the vane electrodes 7 which are arranged in the x=−y plane are preferably segmented along the z-axis. According to the particular embodiment shown in FIG. 5, the vane electrodes 6,7 may be segmented axially so as to comprise twenty separate segmented electrodes arranged along the length of the preferred device. However, other embodiments are contemplated wherein the vane electrodes may be segmented axially into a different number of electrodes.

The first vane electrodes (#1) are preferably arranged at the entrance end of the ion trap whilst the twentieth vane electrodes (#20) are preferably arranged at the exit end of the ion trap.

Figure 6A:
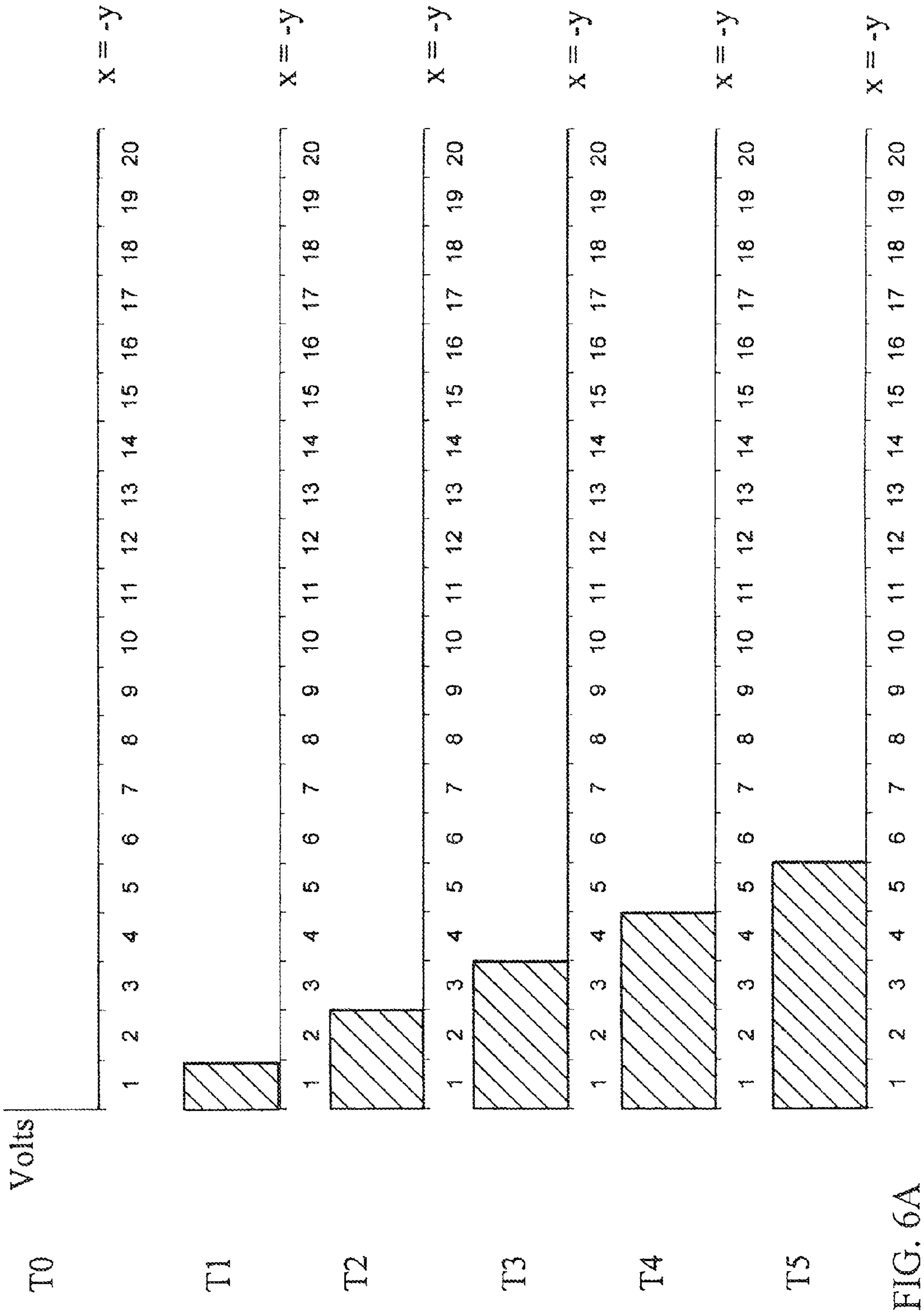
FIG. 6A shows sequences of DC potentials which are preferably applied to individual vane electrodes arranged in the (x=−y), z plane
Figure 6B:
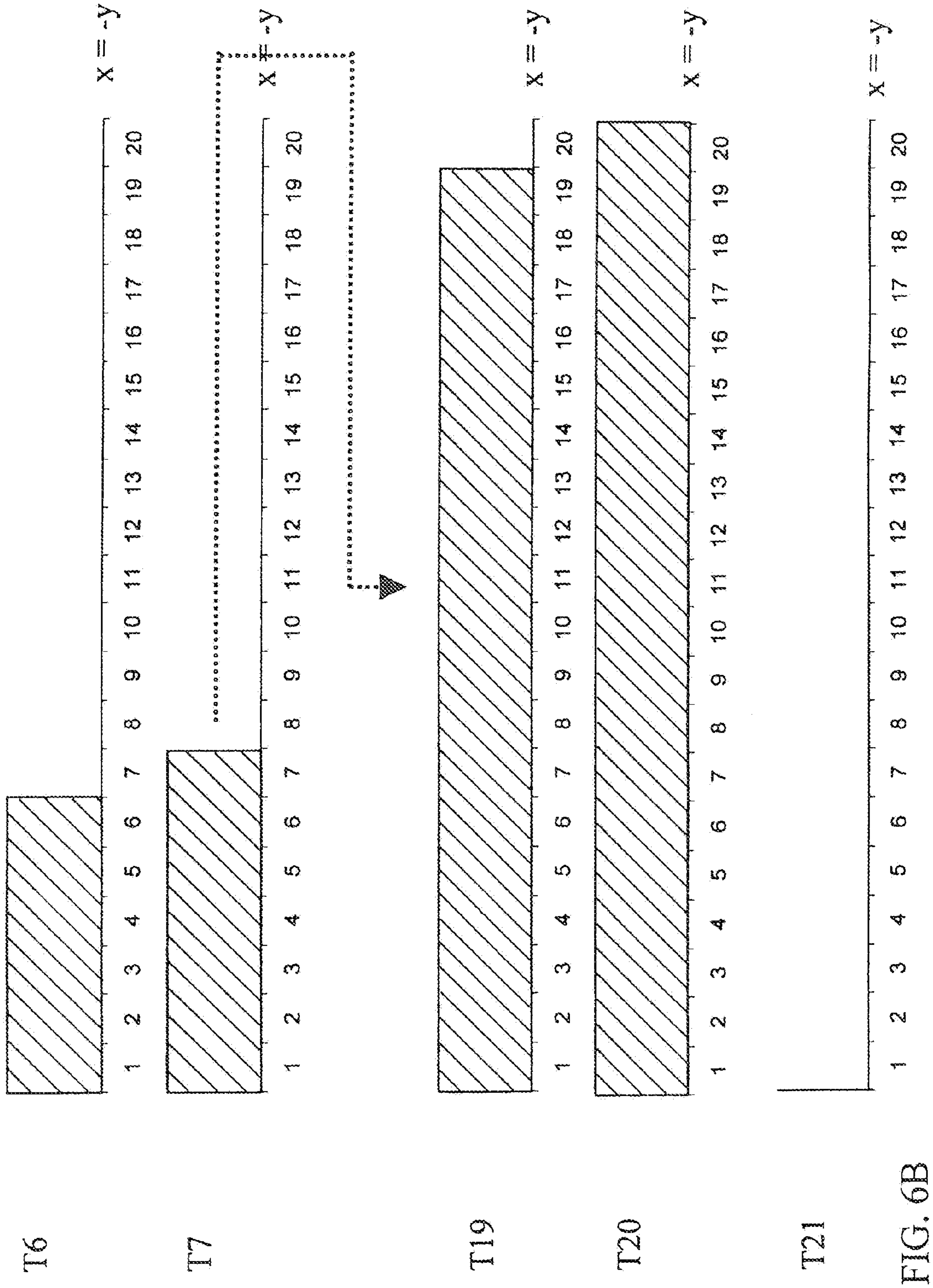
FIG. 6B shows further sequences of DC potentials which are also preferably applied to individual vane electrodes arranged in the (x=−y), z plane.

According to an embodiment DC potentials are preferably applied to the vane electrode 6,7 in accordance with predetermined sequences. FIGS. 6A and 6B illustrate a sequence of DC voltages which are preferably applied sequentially to the segmented vane electrodes 7 arranged in the x=−y plane during a time period from T=T0 to a subsequent time T=T21. At an initial time T=T0, all of the segmented vane electrodes 7 are preferably maintained at the same DC bias potential which is preferably the same as the DC bias applied to the main rod electrodes 2,3 (e.g. zero). At a subsequent time T1, a positive DC potential is preferably applied to the first vane electrodes (#1) which are arranged in the x=−y plane. At a subsequent time T2, a positive DC potential is preferably applied to both the first and the second vane electrodes (#1, #2) arranged in the x=−y plane. This sequence is preferably developed and repeated so that DC potentials are preferably progressively applied to further vane electrodes 7 until at a later time T20 DC potentials are preferably applied to all of the vane electrodes 7 arranged in the x=−y plane. Finally, at a subsequent time T21, the DC potentials applied to the vane electrodes 7 arranged in the x=−y plane are preferably removed substantially simultaneously from all of the vane electrodes 7. For the analysis of negatively charged ions (i.e. anions), negative DC potentials rather than positive DC potentials are preferably applied to the vane electrodes 7.

Figure 7A:
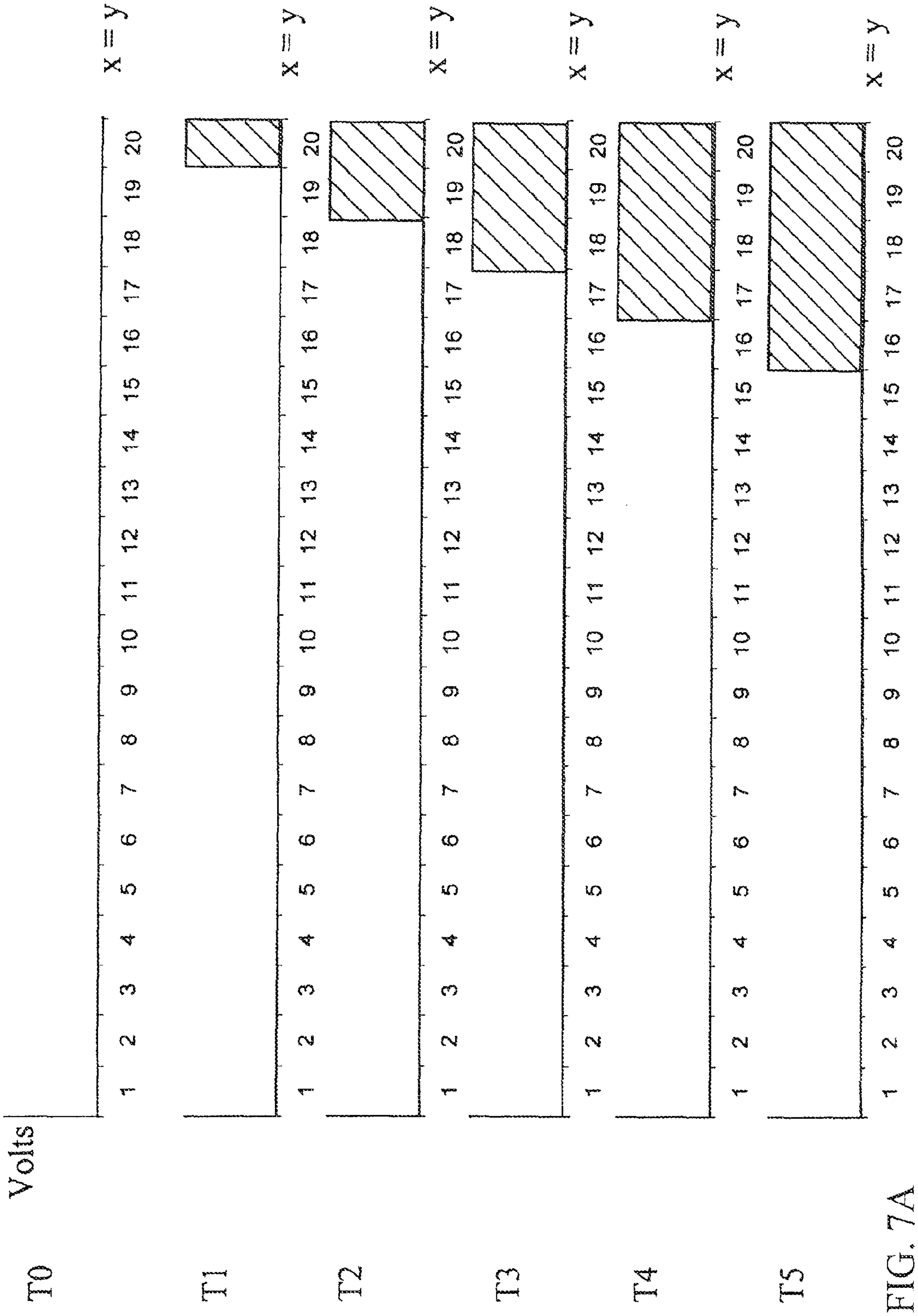
FIG. 7A shows corresponding sequences of DC potentials which are preferably applied to individual vane electrodes arranged in the (x=y), z plane
Figure 7B:
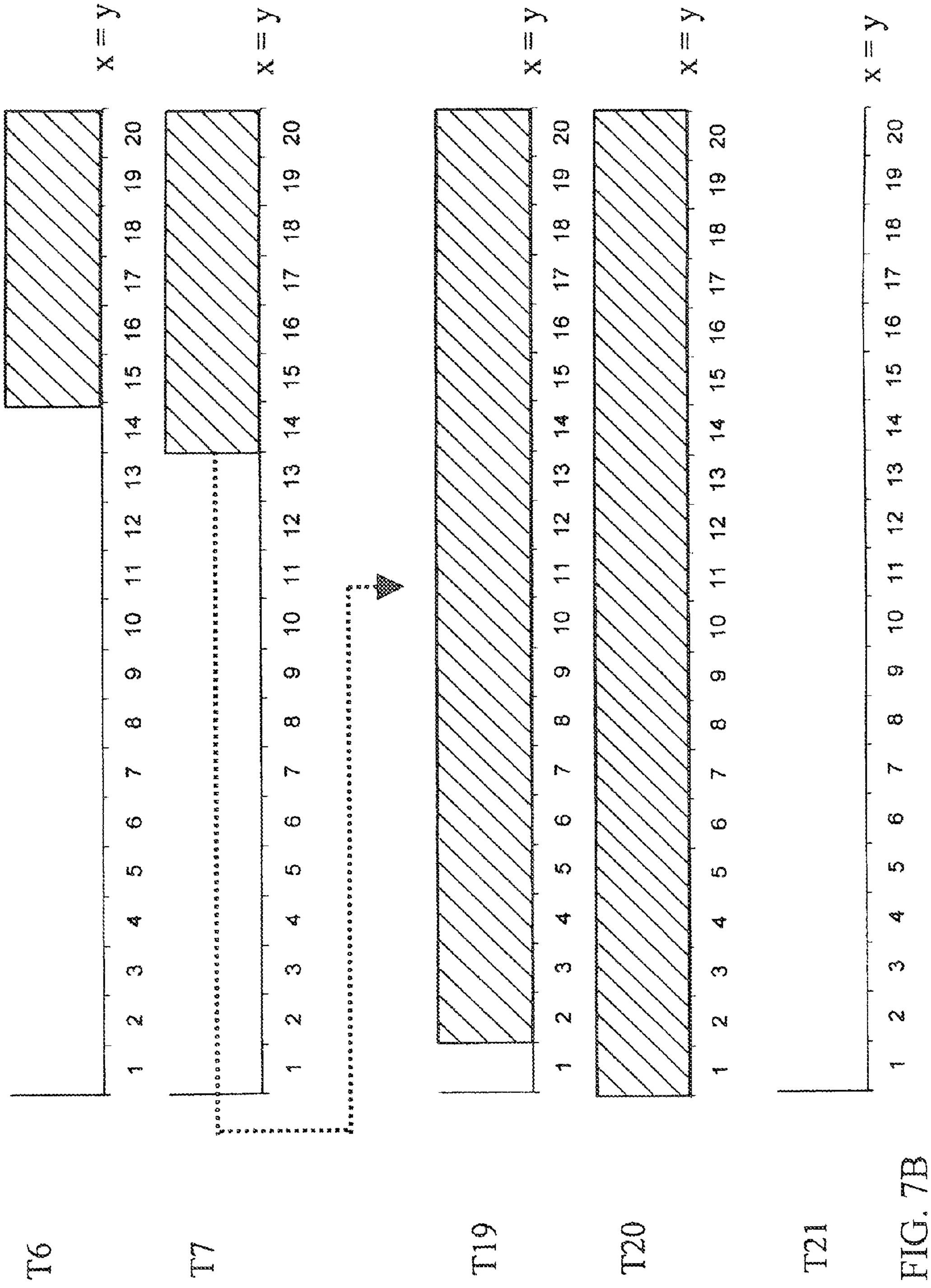
FIG. 7B shows further sequences of DC potentials which are also preferably applied to individual vane electrodes arranged in the (x=y), z plane.

At the same time that positive DC potentials are preferably applied to the vane electrodes 7 arranged in the x=−y plane, positive DC potentials are also preferably applied to the vane electrodes 6 arranged in the x=y plane. FIGS. 7A and 78 illustrate a sequence of DC voltages which are preferably applied sequentially to the segmented vane electrodes 6 which are arranged in the x=y plane during the time period from T=T0 to a subsequent time T=T21. At the initial time T=T0, all of the segmented vane electrodes 6 are preferably maintained at the same DC bias potential which is preferably the same as the DC bias applied to the main rod electrodes 2,3 (i.e. zero). At a subsequent time T1, a positive DC potential is preferably applied to the twentieth vane electrodes (#20) which are arranged in the x=y plane. At a subsequent time T2, a positive DC potential is preferably applied to both the nineteenth and the twentieth vane electrodes (#19,#20) arranged in the x=y plane. This sequence is preferably developed and repeated so that DC potentials are preferably progressively applied to further vane electrodes 6 until at the later time T20 DC potentials are preferably applied to all of the vane electrodes 6 arranged in the x=y plane. Finally, at a subsequent time T21, the DC potentials applied to the vane electrodes 6 arranged in the x=y plane are preferably removed substantially simultaneously from all, of the vane electrodes 6. For the analysis of negatively charged ions (i.e. anions), negative DC potentials rather than positive DC potentials are preferably applied to the vane electrodes 6.

For trapped positively charged ions which are, on average, distributed randomly with respect to the central axis of the ion trap, the effect of applying DC potentials to the segmented vane electrodes 7 which are arranged in the x=−y plane and at the same time applying DC potentials to the segmented vane electrodes 6 which are arranged in the x=y plane following the sequences described above with reference to FIGS. 6A-B and FIGS. 7A-B is to urge ions located along the central axis of the ion trap equally in the direction towards the entrance of the ion trap and in the direction towards the exit of the preferred device. Consequently, ions which are located along the central axis of the ion trap will experience zero net force and will not, on average, gain energy in either direction.

However, ions which are displaced radially from the central axis either towards the vane electrodes 6 arranged in the x=−y plane or towards the vane electrodes 7 arranged in the x=y plane will preferably gain energy in one direction as the two series of DC potentials are applied sequentially and simultaneously to the vane electrodes 6,7. Ions which are radially excited are therefore, preferably transmitted or urged by the transient DC potentials applied to the vane electrodes 6,7 towards the exit of the ion trap.

According to, one embodiment a small AC or tickle voltage is preferably also applied between all of the opposing segments of the vane electrodes 7 arranged in the x=−y plane. According to this embodiment one phase of the AC voltage is preferably applied to all of the vane electrodes which are arranged on one side of the central axis whilst the opposite phase of the AC voltage is preferably applied to all of the vane electrodes which are arranged on the other side of the central axis. The frequency of the AC or tickle voltage applied to the vane electrodes 7 preferably corresponds with or to the secular frequency (see Eqn. 1) of one or more ions within the preferred device which are desired to be ejected axially from the ion trap. The application of the AC voltage preferably causes the ions to increase their amplitude of oscillation in the x=−y plane (i.e. in one radial direction). These ions will, on average, therefore, preferably experience a stronger field effecting acceleration towards the exit of the preferred device than a corresponding field effecting acceleration towards the entrance of the preferred device. Once the ions have acquired sufficient axial energy then the ions preferably overcome the radially dependent DC potential barrier provided by the exit electrodes 9. The exit electrodes 9 are preferably arranged to create a radially dependent DC potential barrier in a manner as described above. Other embodiments are contemplated wherein ions having mass to charge ratios within a first range may be urged, directed, accelerated or propelled in a first axial direction whilst other ions having different mass to charge ratios within a second different range may be simultaneously or otherwise urged, directed, accelerated or propelled in a second different axial direction. The second axial direction is preferably orthogonal to the first axial direction.

An ion trap comprising segmented vane electrodes 6,7 wherein one or more sequences of DC voltages are applied sequentially to the vane electrodes 6,7 preferably has the advantage that ions which are excited radially are then actively transported to the exit region of the ion trap by the application of the transient DC voltages or potentials to the vane electrodes 6,7. The ions are then preferably ejected axially from the ion trap without delay irrespective of their initial position along the z-axis of the ion trap.

The sequence of DC voltages or potentials which are preferably applied to the vane electrodes 6,7 as described above with reference to FIGS. 6A-6B and FIGS. 7A-7B illustrate just one particular combination of sequences of DC potentials which may be applied to the segmented vane electrodes 6,7 in order to urge or translate ions along the length of the ion trap once ions have been excited in a radial direction. However, other embodiments are contemplated wherein different sequences of DC potentials may be applied to one or more of the sets of vane electrodes 6,7 with similar results.

The ion trap comprising segmented vane electrodes 6,7 as described above may be operated in various different modes of operation. For example, in one mode of operation the amplitude of the transient DC voltages applied to the segmented vane electrodes 6 arranged in the x=y plane may be arranged so that the amplitude is larger than the amplitude of the transient DC voltages applied to the segmented vane electrodes 7 arranged in the x y plane. As a result, ions which are, on average, distributed randomly with respect to the central axis of the ion trap will be urged towards the entrance region of the ion trap. The ions may be trapped in a localised area of the ion trap by appropriate application of a DC voltage which is preferably applied to the entrance electrode 8. Ions which are displaced sufficiently in the x=−y plane by application of a supplementary AC or tickle voltage which is preferably applied across the vane electrodes 7 arranged in the x=−y plane preferably causes the ions to be accelerated towards the exit of the preferred device. The ions are then preferably ejected from the ion trap in an axial direction.

Further embodiments of the present invention are contemplated wherein ions having different mass to charge ratios may be sequentially released or ejected from the ion trap by varying or scanning with time one or more parameters which relate to the resonant mass to charge ratio of ions. For example, with reference to Eqn. 1, the frequency of the supplementary AC or tickle voltage which is applied to one of the pairs of rod electrodes 2,3 and/or to one of the sets of vane electrodes 6,7 may be varied as a function of time whilst the amplitude V of the main RF voltage and/or the frequency of the main RF voltage applied to the rod electrodes 2,3 (in order to confine ions radially within the ion trap) may be maintained substantially constant.

According to another embodiment the amplitude V of the main RF voltage which is applied to the main rod electrodes 2,3 may be varied as a function of time whilst the frequency of the supplementary AC or tickle voltage and/or the frequency Q of the main RF voltage applied to the main rod electrodes 2,3 may be maintained substantially constant.

According to another embodiment, the frequency Ω of the main RF voltage applied to the main rod electrodes 2,3 may be varied as a function of time whilst the frequency of the supplementary AC or tickle voltage and/or the amplitude V of the main RF voltage applied to the main rod electrodes 2,3 may be maintained substantially constant.

According to another embodiment, the frequency Ω of the main RF voltage applied to the rod electrodes 2.3 and/or the frequency of the supplementary AC or tickle voltage and/or the amplitude V of the main RF voltage may be varied in any combination.

Figure 8:
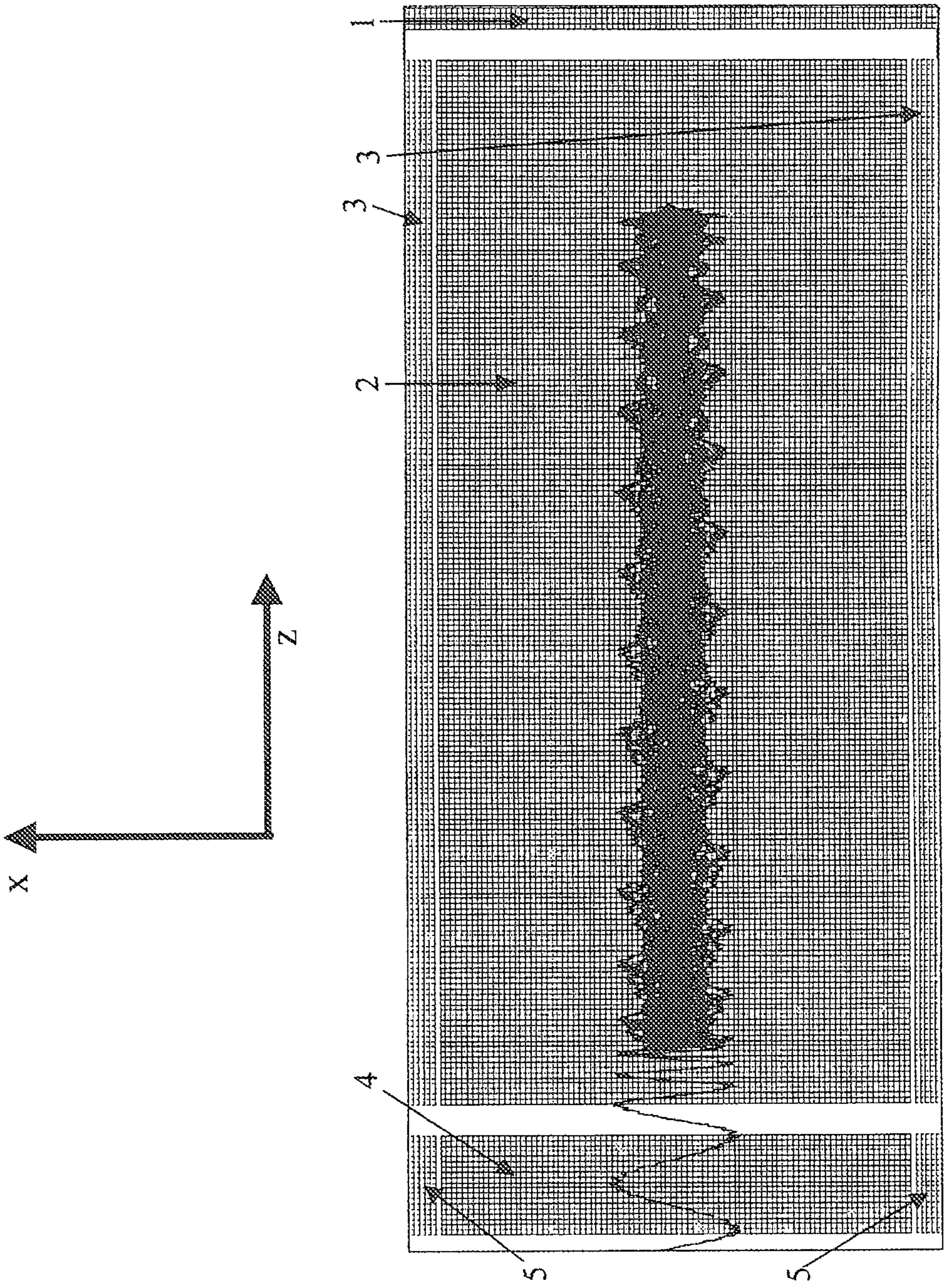
FIG. 8 shows a SIMION® simulation of an ion trap shown in the x,z plane wherein a supplementary AC voltage having a frequency of 69.936 kHz was applied to one of the pairs of rod electrodes in order to excite an ion having a mass to charge ratio of 300.

FIG. 8 shows the result of a SIMION 8® simulation of ion behaviour within a preferred ion trap arranged substantially as shown and described above with reference to FIG. 1. The inscribed radius $R_0$ of the rod electrodes 2,3 was modelled as being 5 mm. The entrance electrode 1 was modelled as being biased at a voltage of +1 V and the rod set electrodes 2,3 were modelled as being biased at a voltage of 0 V. The main RF voltage applied to the rod electrodes 2,3 and to the exit electrodes 45 was set at 150 V (zero to peak amplitude) and at a frequency of 1 MHZ. The same phase RF voltage was applied to one pair 3 of the main rod set electrodes and to one pair 5 of the end electrodes. The opposite phase of the RF voltage was applied to the other pair 2 of the main rod set electrodes and to the other pair 4 of the end electrodes. The pair of y-end electrodes 4 was biased at a voltage of +4 V whereas the pair of x-end electrodes 5 was biased at −3 V. The background gas pressure was modelled as being $10^{-4}$ Torr ($1.3\times10^{-4}$ mbar) Helium (drag model with the drag force linearly proportional to an ions velocity). The initial ion axial energy was set at 0.1 eV.

At initial time zero, five ions were modelled as being provided within the ion trap. The ions were modelled as having mass to charge ratios of 298, 299, 300, 301 and 302. The ions were then immediately subjected to a supplementary or excitation AC field which was generated by applying a sinusoidal AC potential difference of 30 mV (peak to peak) between the pair of x-rod electrodes 3 at a frequency of 69.936 kHz. Under these simulated conditions, the radial motion of the ion having a mass to charge ratio of 300 increased so that it was greater than the width of the axial DC potential barrier arranged at the exit of the ion trap. As a result, the ion having a mass to charge ratio of 300 was extracted or axially ejected from the ion trap after 1.3 ms. The simulation was allowed to continue for the equivalent of 10 ms during which time no further ions were extracted or ejected from the ion trap.

Figure 9:
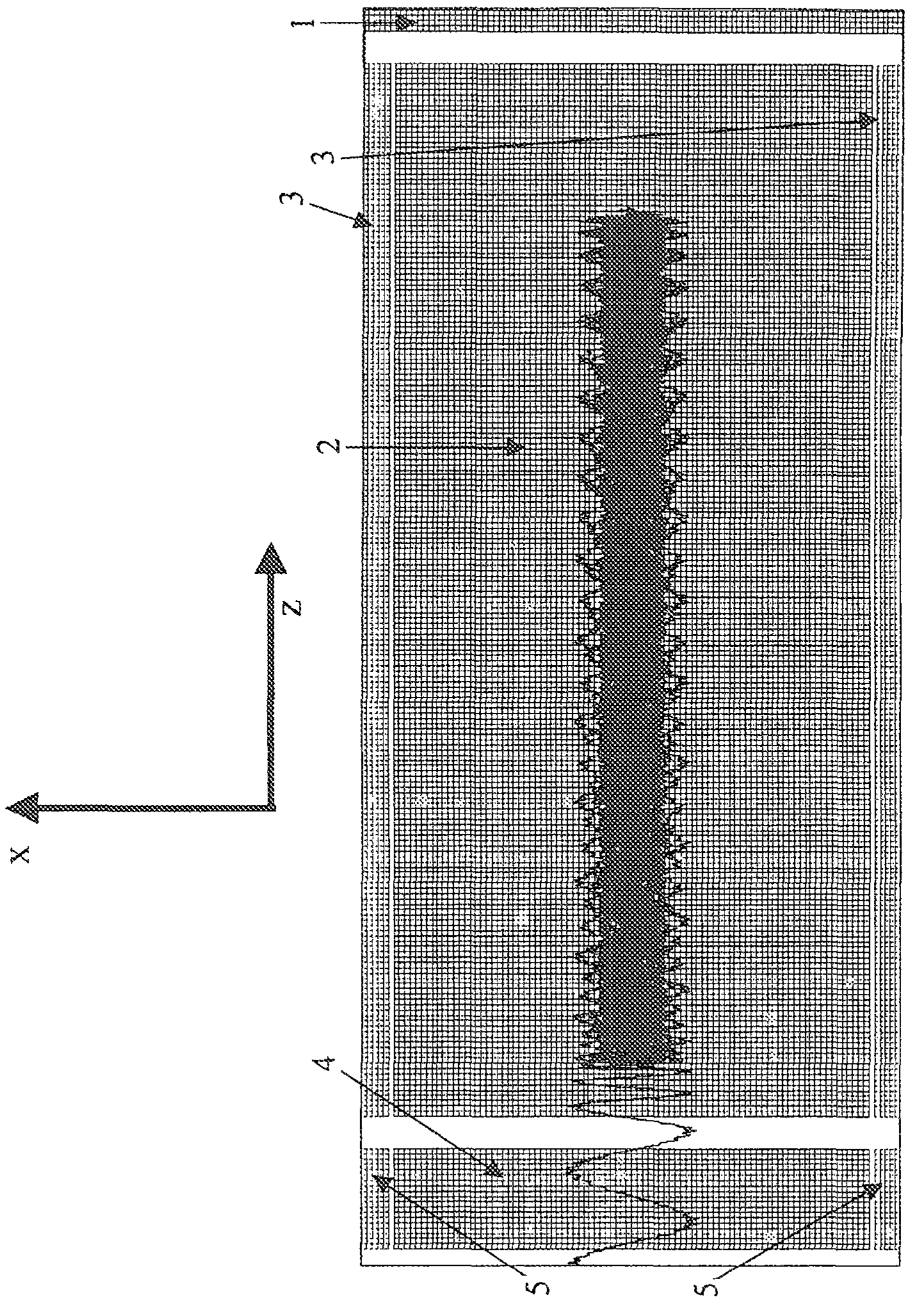
FIG. 9 shows a SIMION® simulation of an ion trap shown in the x,z plane wherein a supplementary AC voltage having a frequency of 70.170 kHz was applied to one of the pairs of rod electrodes in order to excite an ion having a mass to charge ratio of 299.

A second simulation was performed and the results are shown in FIG. 9. All parameters were kept the same as the previous simulation described above with reference to FIG. 8 except that the frequency of the applied supplementary or excitation AC or tickle voltage applied to the pair of x-rod electrodes 3 was increased from 69.936 kHz to 70.170 kHz. In this simulation, the ion having a mass to charge ratio of 299 was this time ejected whilst all the other ions remained confined within the ion trap. This result is in good agreement with Eqn. 1.

Figure 10:
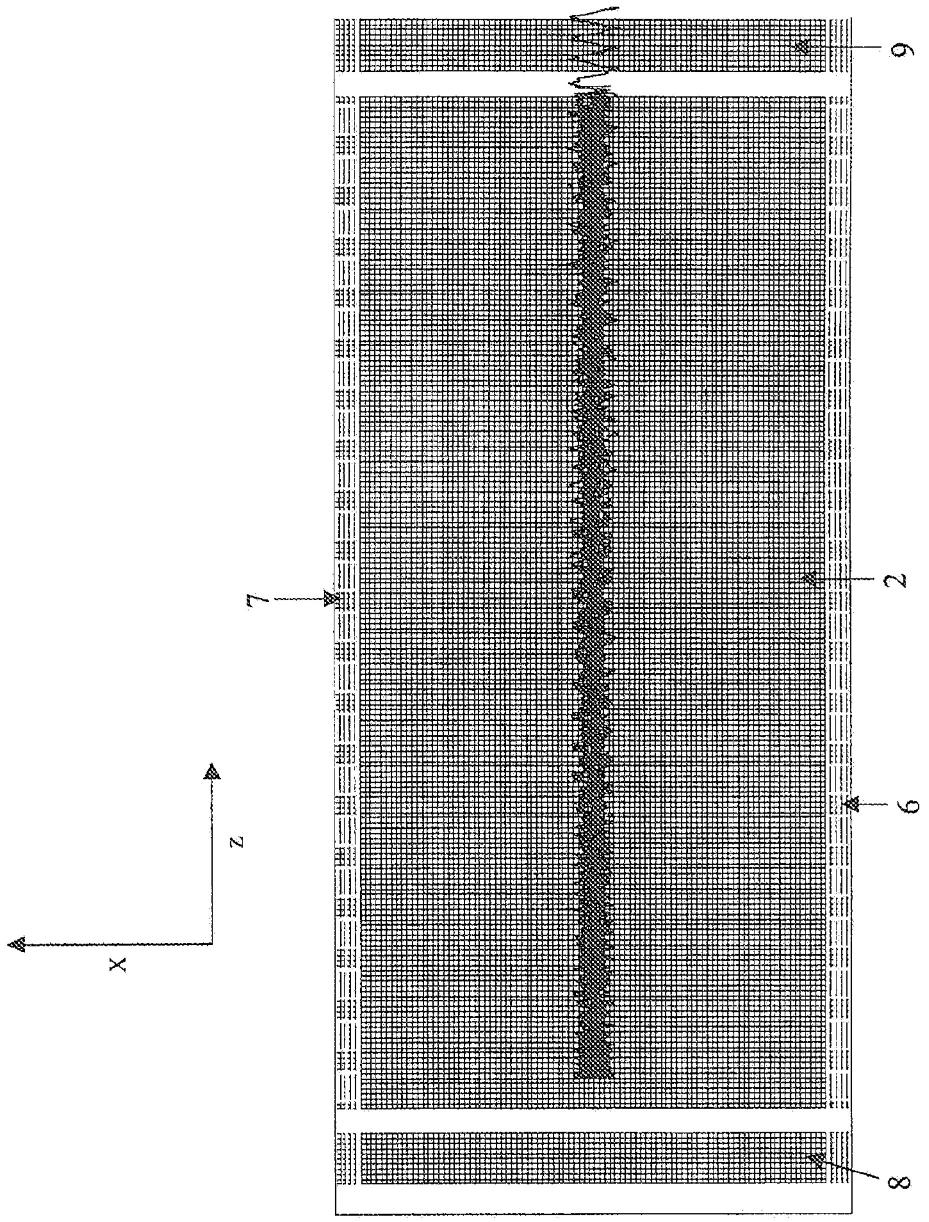
FIG. 10 shows a SIMION® simulation of an ion trap comprising vane electrodes shown in the x,z plane wherein an AC voltage was applied between the vane electrodes and two sequences of DC potentials having equal amplitudes were applied to the vane electrodes.

FIG. 10 shows the results of another SIMION 8® simulation wherein the performance an ion trap comprising segmented vane electrodes 6,7 similar to that shown in FIG. 5 was modelled. The ion trap was modelled as being operated in a mode wherein a sequence of DC potentials was applied to the vane electrodes 6,7 in a manner substantially similar to that as shown and described above with reference to both FIGS. 6A-B and FIGS. 7A-B.

The vane electrodes 6,7 were modelled as comprising two sets of electrodes. One set of vane electrodes 6 was arranged in the x y plane and the other set of vane electrodes 7 was arranged in the x=−y plane. Each set of vane electrodes comprised two strips of electrodes with a first strip of electrodes arranged on one side of the central ion guiding region and a second strip of electrodes arranged on the other side of the central ion guiding region. The first and second strips of electrodes were arranged co-planar. Each strip of electrodes comprised twenty separate vane electrodes. Each individual vane electrode extended 1 mm along the z axis (or axial direction). A 1 mm separation was maintained between neighbouring vane electrodes. The internal inscribed radius of the quadrupole rod set $R_0$ was set at 5 mm and the internal inscribed radius resulting from the two pairs of vane electrodes 6,7 was set at 2.83 mm.

A DC bias of +2 V was modelled as being applied to the entrance electrode 8 and the DC bias applied to the exit electrodes 9 was also modelled as being +2 V. The DC bias applied to the main rod electrodes 2,3 was set at 0 V. The amplitude of RF potential applied to the rod electrodes 2,3 and to the exit electrodes 9 was set at 450 V zero to peak and the frequency of the RF potential was set at 1 MHz. The background gas pressure was set at $10^{-4}$ Torr ($1.3\times10^{-4}$ mbarr) Helium (drag model). The ion initial axial energy was set at 0.1 eV. Transient DC voltages were applied to the vane electrodes 6,7 with the time step between each application of DC voltages to the segmented vane electrodes 6,7 being set at 0.1 μs. The amplitude of the DC voltages applied to both sets of segmented vane electrodes 6,7 was set at 4 V.

At time zero, six positive ions were modelled as being provided within the ion trap. The ions were modelled as having mass to charge ratios of 327, 328, 329, 330, 331 and 332. The ions were then immediately subjected to a supplementary or excitation AC field generated by applying a sinusoidal AC potential difference of 160 mV (peak to peak) between the vane electrodes 7 arranged in the x=−y plane. The frequency of the supplementary or excitation AC voltage was set at 208.380 kHz. Under these simulated conditions, the radial motion of the ion having a mass to charge ratio of 329 increased in the x=−y plane with the result that the ion then gained axial energy in the z-axis due to the transient DC voltages which were applied to the vane electrodes 6,7. The ion having a mass to charge ratio of 329 was accelerated towards the exit electrodes 9. The ion achieved sufficient axial energy to overcome the DC barrier imposed by the exit electrodes 9. As a result, the ion having a mass to charge ratio of 329 was extracted or axially ejected from the ion trap after approximately 0.65 ms. Other ions remained trapped within the ion trap.

Figure 11:
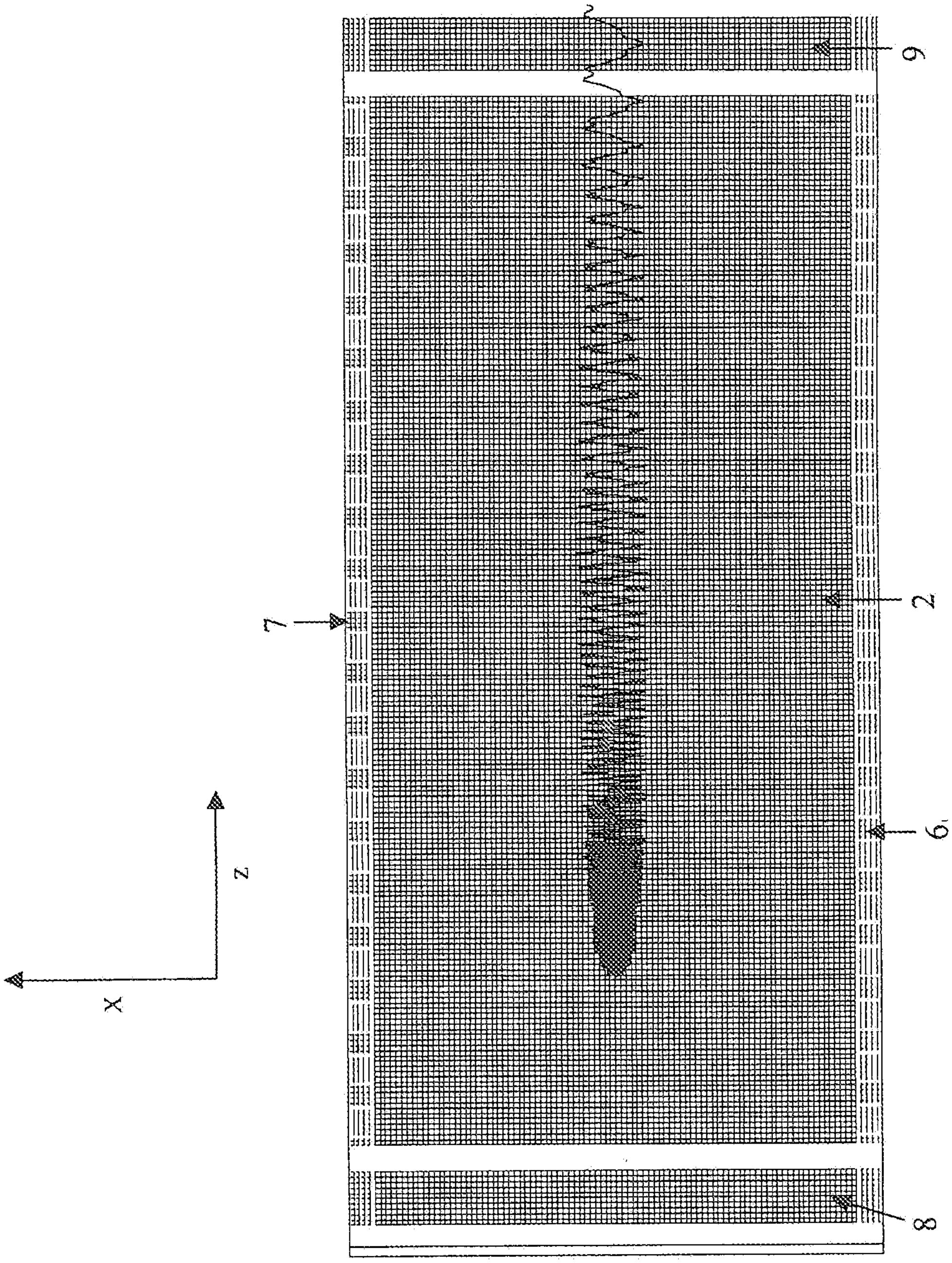
FIG. 11 shows a SIMION® simulation of an ion trap comprising vane electrodes shown in the x,z plane wherein an AC voltage was applied between the vane electrodes and two sequences of DC potentials having different amplitudes were applied to the vane electrodes.

FIG. 11 shows the results of a second SIMION 8® simulation of an ion trap having segmented vane electrodes 6,7. The ion trap was arranged and operated in a mode similar to that described above with reference to FIG. 10. However, according to this simulation the DC bias applied to the exit electrodes 9 was reduced to 0V. The amplitude of the DC voltages which were progressively applied to the vane electrodes 7 arranged in the x=−y plane were set at 3.5 V whereas the amplitude of the DC voltages which were progressively applied to the vane electrodes 6 arranged in the x=y plane were set at 4.0 V. The amplitude of the auxiliary or excitation AC voltage applied across the vane electrodes 7 arranged in the x=−y plane was set at 120 mV (peak to peak) and had a frequency of 207.380 kHz.

The six ions having differing mass to charge ratios were confined initially at the upstream end of the ion trap close to the entrance electrode 8. The radial motion of the ion having a mass to charge ratio of 329 increased in the x=−y plane until the average force accelerating this on towards the exit of the preferred device, exceeded the average force accelerating this ion towards the entrance of the preferred device. The ion having a mass to charge ratio of 329 is shown exiting the preferred device after approximately 0.9 ms.

According to an embodiment of the present invention, the preferred device may be operated in a plurality of different modes. For example, in one mode of operation the preferred device may be operated as a linear ion trap. In another mode of operation the preferred device may be operated as a conventional quadrupole rod set mass filter or mass analyser by applying appropriate RF and resolving DC voltages to the rod electrodes. DC voltages may be applied to the exit electrodes so as to provide a delayed DC ramp otherwise known as a Brubaker lens or post filter.

According to another embodiment the preferred device may be operated as an isolation cell and/or as a fragmentation cell. A population of ions may be arranged to enter the preferred device. A supplementary AC or tickle voltage may then be applied to isolate ions. The supplementary AC or fickle voltage preferably contains frequencies corresponding to the secular frequencies of ions having a variety of mass to charge ratios but does not include the secular frequency corresponding to ions which are desired to be isolated and retained initially within the ion trap. The supplementary AC or tickle voltage preferably serves to excite resonantly unwanted or undesired ions so that they are preferably lost to the rods or the system. The remaining isolated ions are then preferably axially ejected, and/or subjected to one or more fragmentation processes within the preferred device.

According to an embodiment ions may be subjected to one or more fragmentation processes within the preferred device including Collision Induced Dissociation ("CID"), Electron Transfer Dissociation ("ETD") or Electron Capture Dissociation ("ECD"). These processes may be repeated to facilitate MT experiments. Fragment ions which result may be released in a mass selective or a non-mass selective manner to a further preferred device arranged downstream.

Figure 12:
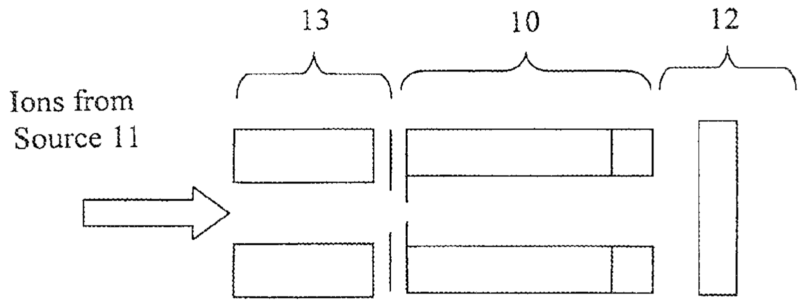
FIG. 12 shows a mass spectrometer according to an embodiment comprising a preferred ion trap and an ion detector.

Other embodiments are contemplated wherein the preferred device may be operated as a stand alone device as shown, for example, in FIG. 12. According to this embodiment an ion source 11 may be arranged upstream of the preferred device 10 and an ion detector 12 may be arranged downstream of the preferred device 10. The ion source 11 preferably comprises a pulsed ion source such as a Laser Desorption ionisation ("LDI") ion source, a Matrix Assisted Laser Desorption Ionisation ("MALDI") ion source or a Desorption ionisation on Silicon ("DIOS") on source.

Alternatively, the ion source 11 may comprise a continuous ion source. If a continuous ion source is provided then an additional ion trap 13 may be provided upstream of the preferred device 10. The ion trap 13 preferably acts to store ions and then preferably periodically releases ions towards and into the preferred device 10. The continuous ion source may comprise an Electrospray Ionisation ("ESI") ion source, an Atmospheric Pressure Chemical Ionisation ("APCI") ion source, an Electron Impact ("EI") ion source, an Atmospheric Pressure Photon ionisation ("APPI") ion source, a Chemical Ionisation ("CI") ion source, a Desorption Electrospray Ionisation ("DESI") ion source, an Atmospheric Pressure MALDI ("AP-MALDI") ion source, a Fast Atom Bombardment ("FAB") ion source, a Liquid Secondary Ion Mass Spectrometry ("LSIMS") ion source, a Field Ionisation ("FI") ion source or a Field Desorption ("FD") ion source. Other continuous or pseudo-continuous ion sources may alternatively be used.

Figure 13:
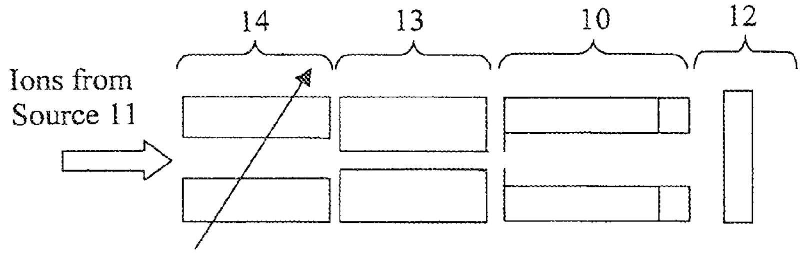
FIG. 13 shows a mass spectrometer according to an embodiment comprising a mass filter or mass analyser arranged upstream of a preferred ion trap and ion detector.

According to an embodiment the preferred device may be incorporated to form a hybrid mass spectrometer. For example, according to an embodiment as shown in FIG. 13, a mass analyser or a mass filter 14 in combination with a fragmentation device 13 may be provided upstream of the preferred device 10. An ion trap (not shown) may also be provided upstream of the preferred device 10 in order to store ions and then periodically release ions towards and into the preferred device 10. The fragmentation device 13 may in certain modes of operation, be configured to operate as an ion trap or ion guide. According to the embodiment shown in FIG. 13, ions which have first been mass selectively transmitted by the mass analyser or mass filter 14 may then be fragmented in the fragmentation device 13. The resulting fragment ions are then preferably mass analysed by the preferred device 10 and ions which are elected axially from the preferred device 10 are then preferably detected by the downstream or detector 12.

The mass analyser or mass filter 14 as shown in FIG. 13 preferably comprise a quadrupole rod set mass filter or another ion trap. Alternatively, the mass analyser or mass filter 14 may comprise a magnetic sector mass filter or mass analyser or an axial acceleration Time of Flight mass analyser.

The fragmentation device 13 is preferably arranged to fragment ions by Collision Induced Dissociation ("CID"), Electron Capture Dissociation ("ECD"), Electron Transfer Dissociation ("ETD") or by Surface Induced Dissociation ("SID").

Figure 14:
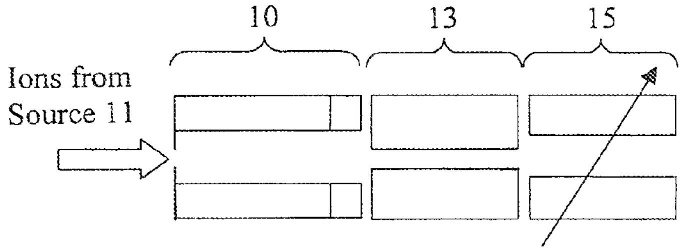
FIG. 14 shows a mass spectrometer according to an embodiment comprising a preferred ion trap arranged upstream of a mass filter or a mass analyser.

A mass spectrometer according to another embodiment is shown in FIG. 14. According to this embodiment a preferred device 10 is preferably arranged upstream of a fragmentation device 13 and a mass analyser 15. The fragmentation device 13 is preferably arranged downstream of the preferred device 10 and upstream of the mass analyser 15. An ion trap (not shown) may be arranged upstream of the preferred device 10 in order to store and then periodically release ions towards the preferred device 10. The geometry shown in FIG. 14 preferably allows ions to be axially ejected from the preferred device 10 in a mass dependent manner. The ions which are axially ejected from the preferred device 10 are then preferably fragmented in the fragmentation device 13. The resulting fragment ions are then preferably analysed by the mass analyser 15.

The embodiment shown and described above with reference to FIG. 14 preferably facilitates parallel MS/MS experiments to be performed wherein ions exiting the preferred device 10 in a mass dependent manner are then preferably fragmented. This allows the assignment of fragment ions to precursor ions to be achieved with a high duty cycle. The fragmentation device 13 may be arranged to fragment ions by Collision Induced Dissociation ("CID"), Electron Capture Dissociation ("ECD"), Electron Transfer Dissociation ("ETD") or Surface induced Dissociation ("SID"). The mass analyser 15 arranged downstream of the fragmentation device 13 preferably comprises a Time of Flight mass analyser or another ion trap. According to other embodiments the mass analyser 15 may comprise a magnetic sector mass analyser, a quadrupole rod set mass analyser or a Fourier Transform based mass analyser such as an orbitrap mass spectrometer.

Further embodiments of the present invention are contemplated wherein ions may be displaced radially within the ion trap by means other than by applying a resonant supplementary AC or tickle voltage. For example, ions may be displaced radially by mass selective instability and/or by parametric excitation and/or by applying DC potentials to one or more of the rod electrodes 2,3 and/or to one or more of the vane electrodes 6,7.

According to a less preferred embodiment ions may be ejected axially from one or both ends of the ion trap in a sequential and/or simultaneous manner.

According to an embodiment the preferred device may be configured so that multiple different species of ions having different specific mass to charge ratios may be ejected axially from the ion trap at substantially the same time and hence in a substantially parallel manner.

The preferred device may be operated at elevated pressures so that ions may in a mode of operation be separated temporally according to their ion mobility as they pass through or are ejected from the preferred device.

The hybrid embodiments as described above with reference to FIGS. 13 and 14 may also include an ion mobility based separation stage. Ions may be separated according to their ion mobility either within the preferred device 10 and/or within one or more separate ion mobility devices which may, for example, be located upstream and/or downstream of the preferred device 10.

According to an embodiment one or more radially dependent DC barriers may be provided which vary in position with time by segmenting the main quadrupole rod electrodes rather than by providing additional vane electrodes. A DC potential may be applied to the individual segments in a sequence substantially as described above. AC tickle voltage excitation across one or both of the pairs of quadrupole rods will result in mass selective axial ejection.

According to an embodiment the position of different radially dependent barriers may be varied with time.

According to an embodiment different sequences describing the variation of radially dependent barrier position with time may be implemented.

According to an embodiment the axial position of the barrier field may be varied along all or part of the length of the preferred device.

The time interval between the application of DC potentials to different electrode segments within the preferred device may be varied at any point during the operation of the preferred device.

The amplitude of the DC voltages applied to different electrode segments at different times may be varied at any point during the operation of the preferred device.

According to the preferred embodiment the same DC potential may be applied to opposing vane electrodes in the same plane at the same time. However, according to other embodiments one or more DC voltages may be applied in other more complex sequences without altering the principle of operation.

With regard to the embodiment wherein one or more radially dependent DC barrier or barriers are arranged to vary in position with time, the preferred device may be used in conjunction with an energy analyser situated downstream of the preferred embodiment. The energy analyser may comprise, for example, an Electrostatic Analyser ("ESA") or a grid with a suitable DC potential applied.

With regard to the embodiment wherein one or more radially dependent DC barrier or barriers are arranged to vary in position with time, the preferred device may also be used to confine and/or separate positive and negative ions substantially simultaneously.

According to an embodiment the RF quadrupole may have additional DC potentials added leading to a modification of Eqn. 1.

One advantage of the preferred embodiment is that the energy spread of ions exiting the device or ion trap is preferably relatively low and well defined. This is due to the fact that according to the preferred embodiment no axial energy is imparted to the ions from the main radially confining RF potential during the ejection process. This is in contrast to other known ion traps wherein axial energy transfer from the confining RF potential to the confined ions is integral to the ejection process. This axial energy transfer may occur in a fringing field region at the exit of the device due to the interaction of the main RF potential and DC barrier electrode.

The preferred embodiment is therefore particularly advantageous if the ions are to be passed onto a downstream device such as a downstream mass analyser or a collision or reaction gas cell. The acceptance criteria of the downstream device may be such that overall transmission and/or performance of the device is adversely affected by a large spread in the incoming ions kinetic energy.

The kinetic energy of a group of ions exiting an ion trap arranged substantially as described above with reference to FIG. 1 were recorded using a SIMION 8® simulation similar to that described above with reference to FIG. 8. The inscribed radius $R_0$ of the rod electrodes 2,3 was modelled as being 4.16 mm. The entrance electrode 1 was modelled as being biased at a voltage of +1 V and the rod set electrodes 2,3 were modelled as being biased at a voltage of 0 V. The main RF voltage applied to the rod electrodes 2,3 and to the exit electrodes 4,5 was set at 800 V (zero to peak amplitude) and at a frequency of 1 MHz. The same phase RF voltage was applied to one pair 3 of the main rod set electrodes and to one pair 5 of the end electrodes. The opposite phase of the RF voltage was applied to the other pair 2 of the main rod set electrodes and to the other pair 4 of the end electrodes. The pair of y-end electrodes 4 was biased at a voltage of +4 V whereas the pair of x-end electrodes 5 was biased at −2 V. The background gas pressure was modelled as being $10^{-4}$ Torr ($1.3\times10^{-4}$ mbar) Helium (drag model with the drag force linearly proportional to an ions velocity). The initial ion axial energy was set at 0.1 eV.

At initial time zero, 300 ions of mass to charge ratio 609 were modelled as being provided within the ion trap. A sinusoidal AC potential difference of 200 mV (peak to peak) was applied between the pair of x-rod electrodes 3 at a frequency of 240 kHz. The RF voltage applied to the rod electrodes was then ramped from its initial value to 1000 V (zero to peak amplitude). Under these simulated conditions, the radial motion of the ions increased so that it was greater than the width of the axial DC potential barrier arranged at the exit of the ion trap. As a result, the ions exited axially from the ion trap. The kinetic energy of the ions was measured at a distance of 4 mm from the end of end electrodes 5. The mean kinetic energy of the ions was 2 eV and the standard deviation of the kinetic energy was 2.7 eV.

For comparison, an alternative known axially ejection technique was modelled using SIMION 8®. The relevant parameters used were identical to those described above and the fringing field lens at the exit end of the device was set to a DC voltage of +2 volts. In this case, the mean kinetic energy of the ions was 49.1 eV and the standard deviation of the kinetic energy was 561 eV.

Figure 15:
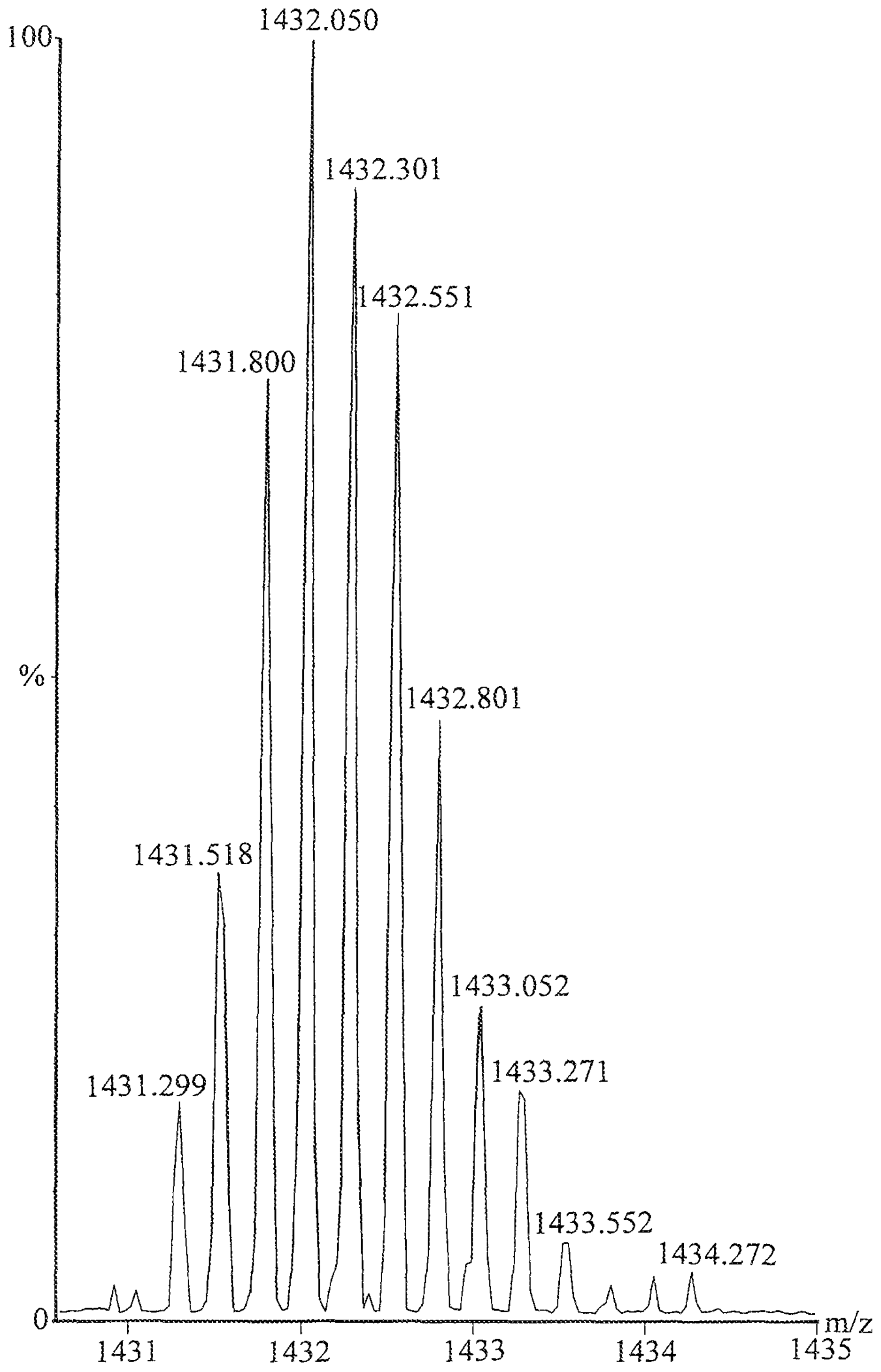
FIG. 15 shows some experimental data.

Data from an experimental ion trap, according to the preferred embodiment, is shown in FIG. 15. The experimental ion trap was installed into a modified triple quadrupole mass spectrometer. A sample of Bovine Insulin was introduced using positive ion Electrospray Ionisation and ions form the 4+ charge state were selected using a quadrupole mass filter upstream of the ion trap. The ion trap was filled with ions for approximately two seconds before an analytical scan of the main confining RF amplitude was performed at a scan rate of 2 Da per second. One pair of exit electrodes were supplied with +20 volts of DC and the other set of exit electrodes were supplied with −14 volts of DC to produce a radially dependent barrier. The mass spectrum of a narrow mass to charge ratio region encompassing the isotope envelope of the 4+ charge state is shown. A mass resolving power of approximately 23,800 was achieved under these conditions.

According to an embodiment, a single multipole rod set may be utilised as a linear ion trap. Several particular mechanical configurations are conceived.

According to an embodiment solid metallic rods where at least one or more regions of the rod additionally comprise a dielectric coating covered by a conductive coating may be provided. The thickness of the coatings is preferably such that the outer diameter of the rod is not substantially increased. DC voltages may then be applied to the conductively coated regions to form one of more axial DC barriers whilst the RF voltage applied to the main rod is intended to act through the coatings with only slight attenuation to form the RF quadrupole field.

Another embodiment is contemplated which is substantially the same as the embodiment described above except that instead of solid metal rods, ceramic, quartz or similar rods with a conductive coating may be used.

Finally, a further embodiment is contemplated which is substantially the same as the two embodiments described above except that a thin electrically insulated wire is coiled around the rod or within grooves fashioned into the rods surface, in replacement of the dielectric and conductive coating.

Although the present invention has been described with reference to preferred embodiments, it will be apparent to those skilled in the art that various modifications in form and detail may be made without departing from the scope of the present invention as set forth in the accompanying claims.

The invention claimed is:

1. An ion trap comprising:

a first electrode set comprising a first plurality of electrodes having a first longitudinal axis;

a second electrode set comprising a second plurality of electrodes having a second longitudinal axis, said second electrode set being arranged downstream of said first electrode set;

a first device arranged and adapted to apply one or more DC voltages to one or more of said first plurality of electrodes or to one or more of said second plurality of electrodes so as to create, in use, an electric potential within said first electrode set or within said second electrode set which increases or decreases or varies with radial displacement in a first radial direction as measured from a central longitudinal axis of said first electrode set or said second electrode set;

a second device arranged and adapted to excite at least some ions within said first electrode set in at least one radial direction or to increase the radial displacement of at least some ions in at least one radial direction within said first electrode set;

a first plurality of vane or secondary electrodes arranged between the electrodes of the first electrode set or a second plurality of vane or secondary electrodes arranged between the electrodes of the second electrode set; and a device arranged and adapted to apply one or more first DC voltages or one or more second DC voltages to at least some of said vane or secondary electrodes.

2. An ion trap as claimed in claim 1, wherein said one or more first DC voltages or said one or more second DC voltages comprise one or more transient DC voltages or potentials or one or more transient DC voltage or potential waveforms.

3. An ion trap as claimed in claim 1, wherein:

(a) said first plurality of electrodes comprises a first multipole rod set comprising a first plurality of rod electrodes or comprises at least 5, 10, 15, 20, 25, 30, 35, 40, 45, 50, 55, 60, 65, 70, 75, 80, 85, 90, 95, 100, 110, 120, 130, 140, 150, 160, 170, 180, 190 or 200 electrodes having apertures through which ions are transmitted in use; or (b) said second plurality of electrodes comprises a second multipole rod set comprising a second plurality of rod electrodes or comprises at least 5, 10, 15, 20, 25, 30, 35, 40, 45, 50, 55, 60, 65, 70, 75, 80, 85, 90, 95, 100, 110, 120, 130, 140, 150, 160, 170, 180, 190 or 200 electrodes having apertures through which ions are transmitted in use.

4. An ion trap as claimed in claim 1, wherein said first device is arranged and adapted to apply one or more DC voltages to one or more of said first plurality of electrodes or to one or more of said second plurality electrodes so that:

(a) ions having a radial displacement within a first range experience a DC trapping field, a DC potential barrier or a barrier field which acts to confine at least some of said ions in at least one axial direction within said ion trap; and (b) ions having a radial displacement within a second different range experience either: (i) a substantially zero DC trapping field, no DC potential barrier or no barrier field so that at least some of said ions are not confined in said at least one axial direction within said ion trap; or (ii) a DC extraction field, an accelerating DC potential difference or an extraction field which acts to extract or accelerate at least some of said ions in said at least one axial direction or out of said ion trap.

5. An ion trap as claimed in claim 4, wherein said second device is arranged:

(i) to cause at least some ions having a radial displacement which falls within said first range at a first time to have a radial displacement which falls within said second range at a second subsequent time; or (ii) to cause at least some ions having a radial displacement which falls within said second range at a first time to have a radial displacement which falls within said first range at a second subsequent time.

6. An ion trap as claimed in claim 1, wherein said first device is arranged and adapted to apply one or more DC voltages to one or more of said first plurality of electrodes or to one or more of said second plurality of electrodes so as to create, in use, an electric potential which increases or decreases or varies with radial displacement in a second radial direction as measured from a central longitudinal axis of said first electrode set or said second electrode set, wherein said second radial direction is orthogonal to said first radial direction.

7. An ion trap as claimed in claim 1, wherein said first device is arranged and adapted to apply one or more DC voltages to one or more of said first plurality of electrodes or to one or more of said second plurality of electrodes so as to confine at least some positive or negative ions axially within said ion trap if said ions have a radial displacement as measured from a central longitudinal axis of said first electrode set or said second electrode set less than a first value.

8. An ion trap as claimed in claim 1, wherein said first device is arranged and adapted to apply one or more DC voltages to one or more of said first plurality of electrodes or to one or more of said second plurality of electrodes so as to create, in use, an extraction field which acts to extract or accelerate at least some positive or negative ions out of said ion trap if said ions have a radial displacement as measured from a central longitudinal axis of said first electrode set or said second electrode set greater than a first value.

9. An ion trap as claimed in claim 1, wherein said first electrode set comprises a first central longitudinal axis or a second central longitudinal axis and wherein:

(i) there is a direct line of sight along said first central longitudinal axis or said second central longitudinal axis; or (ii) there is substantially no physical axial obstruction along said first central longitudinal axis or said second central longitudinal axis; or (iii) ions transmitted, in use, along said first central longitudinal axis or said second central longitudinal axis are transmitted with an ion transmission efficiency of substantially 100%.

10. A method of trapping ions comprising:

providing a first electrode set comprising a first plurality of electrodes having a first longitudinal axis;

providing a second electrode set comprising a second plurality of electrodes having a second longitudinal axis, said second electrode set being arranged downstream of said first electrode set;

applying one or more DC voltages to one or more of said first plurality of electrodes or to one or more of said second plurality of electrodes so as to create an electric potential within said first electrode set or within said second electrode set which increases or decreases or varies with radial displacement in a first radial direction as measured from a central longitudinal axis of said first electrode set or said second electrode set;

exciting at least some ions within said first electrode set in at least one radial direction or increasing a radial displacement of at least some ions in at least one radial direction within said first electrode set;

providing a first plurality of vane or secondary electrodes arranged between the electrodes of the first electrode set or a second plurality of vane or secondary electrodes arranged between the electrodes of the second electrode set; and applying one or more first DC voltages or one or more second DC voltages to at least some of said vane or secondary electrodes.

11. A method as claimed in claim 10, wherein said one or more first DC voltages or said one or more second DC voltages comprise one or more transient DC voltages or potentials or one or more transient DC voltage or potential waveforms.

12. An ion trap comprising:

a first electrode set comprising a first plurality of electrodes having a first longitudinal axis;

a second electrode set comprising a second plurality of electrodes having a second longitudinal axis, said second electrode set being arranged downstream of said first electrode set;

a first device arranged and adapted to apply one or more DC voltages to one or more of said second plurality of electrodes so as to create, in use, an electric potential within said first electrode set or within said second electrode set which increases or decreases or varies with radial displacement in a first radial direction as measured from a central longitudinal axis of said first electrode set or said second electrode set; and a second device arranged and adapted to excite at least some ions within said first electrode set in at least one radial direction or to increase a radial displacement of at least some ions in at least one radial direction within said first electrode set;

wherein said first electrode set is axially segmented into a plurality of axial segments and wherein in a mode of operation at least some of said plurality of axial segments are maintained at different DC potentials or wherein one or more transient DC potentials or voltages or one or more transient DC potential or voltage waveforms are applied to at least some of said plurality of axial segments so that at least some ions are trapped in one or more axial DC potential wells or wherein at least some ions are urged in a first axial direction or a second opposite axial direction.

13. An ion trap as claimed in claim 12, wherein:

(a) said first plurality of electrodes comprises a first multipole rod set comprising a first plurality of rod electrodes or comprises at least 5, 10, 15, 20, 25, 30, 35, 40, 45, 50, 55, 60, 65, 70, 75, 80, 85, 90, 95, 100, 110, 120, 130, 140, 150, 160, 170, 180, 190 or 200 electrodes having apertures through which ions are transmitted in use; or (b) said second plurality of electrodes comprises a second multipole rod set comprising a second plurality of rod electrodes or comprises at least 5, 10, 15, 20, 25, 30, 35, 40, 45, 50, 55, 60, 65, 70, 75, 80, 85, 90, 95, 100, 110, 120, 130, 140, 150, 160, 170, 180, 190 or 200 electrodes having apertures through which ions are transmitted in use.

14. An ion trap as claimed in claim 12, wherein said first device is arranged and adapted to apply one or more DC voltages to one or more of said second plurality electrodes so that:

(a) ions having a radial displacement within a first range experience a DC trapping field, a DC potential barrier or a barrier field which acts to confine at least some of said ions in at least one axial direction within said ion trap; and (b) ions having a radial displacement within a second different range experience either: (i) a substantially zero DC trapping field, no DC potential barrier or no barrier field so that at least some of said ions are not confined in said at least one axial direction within said ion trap; or (ii) a DC extraction field, an accelerating DC potential difference or an extraction field which acts to extract or accelerate at least some of said ions in said at least one axial direction or out of said ion trap.

15. An ion trap as claimed in claim 14, wherein said second device is arranged:

(i) to cause at least some ions having a radial displacement which falls within said first range at a first time to have a radial displacement which falls within said second range at a second subsequent time; or (ii) to cause at least some ions having a radial displacement which falls within said second range at a first time to have a radial displacement which falls within said first range at a second subsequent time.

16. An ion trap as claimed in claim 12, wherein said first device is arranged and adapted to apply one or more DC voltages to one or more of said second plurality of electrodes so as to create, in use, an electric potential which increases or decreases or varies with radial displacement in a second radial direction as measured from a central longitudinal axis of said first electrode set or said second electrode set, wherein said second radial direction is orthogonal to said first radial direction.

17. An ion trap as claimed in claim 12, wherein said first device is arranged and adapted to apply one or more DC voltages to one or more of said second plurality of electrodes so as to confine at least some positive or negative ions axially within said ion trap if said ions have a radial displacement as measured from a central longitudinal axis of said first electrode set or said second electrode set less than a first value.

18. An ion trap as claimed in claim 12, wherein said first device is arranged and adapted to apply one or more DC voltages to one or more of said second plurality of electrodes so as to create, in use, an extraction field which acts to extract or accelerate at least some positive or negative ions out of said ion trap if said ions have a radial displacement as measured from a central longitudinal axis of said first electrode set or said second electrode set greater than a first value.

19. An ion trap as claimed in claim 12, wherein said first electrode set comprises a first central longitudinal axis or a second central longitudinal axis and wherein:

(i) there is a direct line of sight along said first central longitudinal axis or said second central longitudinal axis; or (ii) there is substantially no physical axial obstruction along said first central longitudinal axis or said second central longitudinal axis; or (iii) ions transmitted, in use, along said first central longitudinal axis or said second central longitudinal axis are transmitted with an ion transmission efficiency of substantially 100%.

20. A method of trapping ions comprising:

providing a first electrode set comprising a first plurality of electrodes having a first longitudinal axis;

providing a second electrode set comprising a second plurality of electrodes having a second longitudinal axis, said second electrode set being arranged downstream of said first electrode set;

applying one or more DC voltages to one or more of said second plurality of electrodes so as to create an electric potential within said first electrode set or within said second electrode set which increases or decreases or varies with radial displacement in a first radial direction as measured from a central longitudinal axis of said first electrode set or said second electrode set; and exciting at least some ions within said first electrode set in at least one radial direction or increasing a radial displacement of at least some ions in at least one radial direction within said first electrode set;

wherein said first electrode set is axially segmented into a plurality of axial segments and wherein in a mode of operation at least some of said plurality of axial segments are maintained at different DC potentials or wherein one or more transient DC potentials or voltages or one or more transient DC potential or voltage waveforms are applied to at least some of said plurality of axial segments so that at least some ions are trapped in one or more axial DC potential wells or wherein at least some ions are urged in a first axial direction or a second opposite axial direction.

* * * * *